US011422533B2

United States Patent
Zhou et al.

(10) Patent No.: US 11,422,533 B2
(45) Date of Patent: Aug. 23, 2022

(54) EQUIPMENT CONTROL METHOD AND DEVICE

(71) Applicant: CAINIAO SMART LOGISTICS HOLDING LIMITED, Grand Cayman (KY)

(72) Inventors: Qin Zhou, Hangzhou (CN); Xiang Zhong, Hangzhou (CN); Jianjun Li, Hangzhou (CN); Maolin Chen, Hangzhou (CN); Xinhua Yu, Hangzhou (CN)

(73) Assignee: Cainiao Smart Logistics Holding Limited, Grand Cayman (KY)

( * ) Notice: Subject to any disclaimer, the term of this patent is extended or adjusted under 35 U.S.C. 154(b) by 43 days.

(21) Appl. No.: 16/920,627

(22) Filed: Jul. 3, 2020

(65) Prior Publication Data
US 2020/0333768 A1 Oct. 22, 2020

Related U.S. Application Data

(63) Continuation of application No. PCT/CN2019/070020, filed on Jan. 2, 2019.

(30) Foreign Application Priority Data

Jan. 5, 2018 (CN) .......................... 201810011976.7

(51) Int. Cl.
*G05B 19/4155* (2006.01)
*B66F 11/04* (2006.01)
*G06K 7/14* (2006.01)

(52) U.S. Cl.
CPC .......... *G05B 19/4155* (2013.01); *B66F 11/04* (2013.01); *G06K 7/1413* (2013.01); *G05B 2219/45014* (2013.01)

(58) Field of Classification Search
None
See application file for complete search history.

(56) References Cited

U.S. PATENT DOCUMENTS 8,529,187 B1 9/2013 Ward et al.
8,845,266 B1 9/2014 Ward et al.
(Continued)

FOREIGN PATENT DOCUMENTS

AU 2011353004 B2 8/2013
CN 1857811 A 11/2006
(Continued)

OTHER PUBLICATIONS

PCT International Search Report and the Written Opinion dated Apr. 9, 2019, issued in related International Application No. PCT/CN2019/070020, with partial English translation (9 pages).
(Continued)

*Primary Examiner* — Mohammad Ali
*Assistant Examiner* — David Earl Ogg
(74) *Attorney, Agent, or Firm* — Sheppard Mullin Richter & Hampton LLP

(57) ABSTRACT

Methods, systems, and apparatus, including computer programs encoded on computer storage media, for controlling equipment are provided. One of the method includes: acquiring distance data between a current position and a target position of transportation equipment; and controlling operations of the transportation equipment and a lifting device of the transportation equipment according to the distance data, comprising: determining, based on a current elevation of the lifting device, a target elevation of the lifting device, and the distance data, an elevating speed of the lifting device and a travel speed of the transportation equipment; and controlling the lifting device to elevate or lower at the elevating speed from the current elevation to the target elevation, and
(Continued)

controlling the transportation equipment to travel at the travel speed.

17 Claims, 20 Drawing Sheets

(56) References Cited

U.S. PATENT DOCUMENTS

| | | | |
|---|---|---|---|
| 9,371,626 B2 | 6/2016 | Kami et al. | |
| 9,811,796 B2 | 11/2017 | Ogilvie et al. | |
| 10,131,451 B2 | 11/2018 | Salgueiro et al. | |
| 10,373,097 B2 | 8/2019 | Kulkarni et al. | |
| 10,442,621 B2 | 10/2019 | Bestic et al. | |
| 2002/0062167 A1* | 5/2002 | Dimitri | G11B 17/228 700/214 |
| 2006/0276930 A1* | 12/2006 | Tsujimoto | B65G 1/0421 700/214 |
| 2012/0126000 A1* | 5/2012 | Kunzig | B66F 9/24 235/385 |
| 2015/0242944 A1 | 8/2015 | Willard et al. | |
| 2016/0176638 A1* | 6/2016 | Toebes | B65G 1/0492 700/216 |
| 2016/0195856 A1 | 7/2016 | Spero | |
| 2016/0297611 A1 | 10/2016 | Williams et al. | |
| 2016/0304281 A1* | 10/2016 | Elazary | B66F 9/07 |
| 2017/0129603 A1 | 5/2017 | Raptopoulos et al. | |
| 2018/0137454 A1 | 5/2018 | Kulkarni et al. | |
| 2019/0016573 A1 | 1/2019 | D'Andrea | |
| 2019/0066035 A1 | 2/2019 | Hance et al. | |
| 2019/0122172 A1 | 4/2019 | Gil et al. | |

FOREIGN PATENT DOCUMENTS

| | | | |
|---|---|---|---|
| CN | 101492124 A | 7/2009 | |
| CN | 102125945 A | 7/2011 | |
| CN | 203740901 U | 7/2014 | |
| CN | 104391510 A | 3/2015 | |
| CN | 104723318 A | 6/2015 | |
| CN | 104769189 A | 7/2015 | |
| CN | 105225090 A | 1/2016 | |
| CN | 105836356 A | 8/2016 | |
| CN | 106115569 A | 11/2016 | |
| CN | 106167180 A | 11/2016 | |
| CN | 106452903 A | 2/2017 | |
| CN | 206125461 U | 4/2017 | |
| CN | 106950972 A | 7/2017 | |
| CN | 107235300 A | 10/2017 | |
| CN | 107450567 A | 12/2017 | |
| CN | 206812739 U | 12/2017 | |
| CN | 109153450 A | 1/2019 | |
| CN | 111033539 A | 4/2020 | |
| DE | 102015104052 A1 | 10/2015 | |
| EP | 0092762 B1 | 10/1986 | |
| EP | 2698337 B9 * | 5/2016 | ............ B66F 9/0755 |
| EP | 3374263 A1 | 9/2018 | |
| JP | 2003-131738 A | 5/2003 | |
| JP | 2004164042 A * | 6/2004 | |
| JP | 2015-522493 A | 8/2015 | |
| KR | 2012-0042324 A | 5/2012 | |

OTHER PUBLICATIONS

PCT International Preliminary Report on Patentability dated Jul. 16, 2020, issued in related International Application No. PCT/CN2019/070020, with English translation (9 pages).

Extended European Search Report dated Jan. 25, 2021, issued in related European Application No. 19736049.8 (10 pages).

State of Washington, "Forklift Safety Guide: Learning the Safe Way to Operate a Forklift May Save Your Life", Jan. 4, 2007, pp. 1-42, retrieved from the internet: URL:https://depts.washington.edu/wineryhs/Content/Forklift%20Safety%20Guide.pdf [retrieved on Jan. 13, 2021].

Government of Alberta, "Forklift Health & Safety Best Practices Guideline", Dec. 31, 2020, pp. 1-48, retrieved from the internet: URL:https://open.alberta.ca/dataset/0ad13591-d9f4-4aab-85f6-28aaa0b41a34/resource/21818a06-3194-4bb6-8715-ac033df83bf0/download/zz-2010-forklift-health-safety-best-practices-guideline-2010-12.pdf [retrieved on Jan. 13, 2021].

First Search dated Jun. 22, 2021, issued in related Chinese Application No. 201810011976.7 (3 pages).

First Office Action dated Jun. 29, 2021, issued in related Chinese Application No. 201810011976.7, with English machine translation (20 pages).

Supplementary Search dated Dec. 23, 2021, issued in related Chinese Application No. 201810011976.7 (2 pages).

* cited by examiner

EQUIPMENT CONTROL METHOD AND DEVICE

CROSS-REFERENCE TO RELATED APPLICATIONS

This application is a continuation application of International Patent Application No. PCT/CN2019/070020, filed with the China National Intellectual Property Administration (CNIPA) on Jan. 2, 2019, which is based on and claims priority to and benefit of Chinese Patent Application No. 201810011976.7, filed with the CNIPA on Jan. 5, 2018, and entitled "EQUIPMENT CONTROL METHOD AND DEVICE." The entire contents of all of the above-identified applications are incorporated herein by reference.

TECHNICAL FIELD

The specification relates to the technical field of logistics information, and in particular, to an equipment control method and device, and computer-readable storage medium.

BACKGROUND

With the development of e-commerce, more and more users purchase goods online. As users purchase more goods, delivery is also increased, and pressure on the logistics industry is increased. In the logistics industry, sorting is one of core links. Based on dramatic increase in the delivery, manually sorting packages cannot meet the demand. Therefore, an automated sorting scheme is generated.

In a sorting scheme in the existing technologies, transportation equipment such as an automated guided vehicle (AGV) is used to realize automated transportation of logistics objects. The AGV is short, and when the AGV goes to a workstation to receive the logistics objects, workers need to bend to place the logistics objects on the AGV. When the AGV needs to place the logistics objects in object collecting equipment, the AGV further needs to pour the logistics objects into the object collecting equipment through a steel framework platform that is suitable for a height of the object collecting equipment.

In a process of applying the foregoing scheme, the inventor found that the existing technologies have the following disadvantages.

Due to a short AGV, workers need to bend each time for placing packages, and therefore it is inconvenient for the workers to operate. In addition, logistics objects need to be poured into the object collecting equipment through a steel framework platform, resulting in a considerable increase in costs.

SUMMARY

In view of the foregoing problems, embodiments of the specification provide an equipment control method. By acquiring distance data between an operation position and a target position of the transportation equipment, the operation of a lifting device of the transportation equipment can be controlled according to the distance data, thereby resolving problems of an inconvenient manual operation and high costs in the existing technologies.

Correspondingly, the embodiments of the specification further provide an equipment control device, to ensure implementation and application of the foregoing method.

To resolve the foregoing problems, the embodiments of the specification disclose an equipment control method, including: acquiring distance data between an operation position and a target position of transportation equipment; and controlling operation of a lifting device of the transportation equipment according to the distance data.

Correspondingly, the embodiments of the specification further disclose an equipment control device, including: an acquiring module configured to acquire distance data between an operation position and a target position of transportation equipment; and a controlling module configured to control operation of a lifting device of the transportation equipment according to the distance data.

Correspondingly, the embodiments of the specification further disclose a device, including: one or more processors; and one or more machine-readable media storing an instruction, the instruction, when executed by the one or more processors, causing the device to perform an equipment control method.

Correspondingly, the embodiments of the specification further disclose one or more machine-readable media storing an instruction, and when the instruction is executed by one or more processors, an equipment control method is performed.

In a first aspect, a method for controlling equipment is provided. The method includes: acquiring distance data between a current position and a target position of transportation equipment; and controlling operations of the transportation equipment and a lifting device of the transportation equipment according to the distance data, comprising: determining, based on a current elevation of the lifting device, a target elevation of the lifting device, and the distance data, an elevating speed of the lifting device, and a travel speed of the transportation equipment; and controlling the lifting device to elevate or lower at the elevating speed from the current elevation to the target elevation, and controlling the transportation equipment to travel at the travel speed.

In an embodiment, the target position comprises at least one of a position of a pickup node, a position of a code scanning node, or a position of a receiving node, the pickup node includes a docking station, the code scanning node includes code scanning equipment, and the receiving node includes object collecting equipment.

In an embodiment, the controlling operations of a lifting device of the transportation equipment and the transportation equipment according to the distance data comprises: if the distance data is greater than or equal to a first distance and less than or equal to a second distance, controlling the lifting device to be elevated from the current elevation at the elevating speed, and controlling the transportation equipment to travel at the travel speed, wherein the current elevation of the lifting device is at the target elevation when the transportation equipment reaches the target position, and wherein the second distance is greater than the first distance.

In an embodiment, if the current elevation of the lifting device is at the target elevation, controlling the lifting device to remain at the target elevation.

In an embodiment, the controlling operations of a lifting device of the transportation equipment and the transportation equipment according to the distance data comprises: if the distance data is less than a third distance, controlling the transportation equipment to travel at a second travel speed, wherein the second travel speed is less than a first travel speed, and the third distance is greater than the second distance and a first distance.

In an embodiment, the controlling operations of a lifting device of the transportation equipment and the transportation equipment according to the distance data comprises: a first distance $s1=L*v2/v1$; a second distance $s2=L*v2/v1+$ Δs; or a third preset distance $s3=2L*v2/v1+\Delta s$; wherein L is a total height of the lifting device, v2 is a maximum travel speed of the transportation equipment, v1 is the elevating speed of the lifting device, and Δs is a distance adjustment constant.

In a second aspect, a device for controlling equipment is provided. The device comprises a processor and a non-transitory computer-readable storage medium storing instructions executable by the processor to cause the system to perform operations. The operations comprise: acquiring distance data between a current position and a target position of transportation equipment; and controlling operations of the transportation equipment and a lifting device of the transportation equipment according to the distance data, comprising: determining, based on a current elevation of the lifting device, a target elevation of the lifting device, and the distance data, an elevating speed of the lifting device, and a travel speed of the transportation equipment; and controlling the lifting device to elevate or lower at the elevating speed from the current elevation to the target elevation, and controlling the transportation equipment to travel at the travel speed.

In a third aspect, a non-transitory computer-readable storage medium for controlling equipment is provided. The storage medium is configured with instructions executable by one or more processors to cause the one or more processors to perform operations. The operations comprise: acquiring distance data between a current position and a target position of transportation equipment; and controlling operations of the transportation equipment and a lifting device of the transportation equipment according to the distance data, comprising: determining, based on a current elevation of the lifting device, a target elevation of the lifting device, and the distance data, an elevating speed of the lifting device, and a travel speed of the transportation equipment; and controlling the lifting device to elevate or lower at the elevating speed from the current elevation to the target elevation, and controlling the transportation equipment to travel at the travel speed.

The embodiments of the specification include the following advantages.

According to the embodiments of the specification, distance data between an operation position and a target position of transportation equipment is acquired, and operation of a lifting device of the transportation equipment is controlled according to the distance data, so that the lifting device is elevated to a highest elevation when the transportation equipment reaches the target position. Since the transportation equipment adopts the lifting device, ergonomic requirements are well met and there is no need for workers to bend for handling logistics packages in a docking process, so that the labor intensity of the workers is reduced, and the sorting efficiency of a sorting system is improved. Moreover, logistics objects do not need to be poured into the object collecting equipment through a steer framework platform, so that the setup costs of the sorting system are reduced, and the flexibility of the sorting system is greatly improved.

DETAILED DESCRIPTION OF THE INVENTION

For clearer and easier understanding of the foregoing objective, characteristic, and advantage of the specification, the following further describes the specification in detail with reference to accompanying drawings and specific implementations.

Common terms in an equipment control method provided in the specification are as follows.

Loading region: a distribution region in which to-be-sorted logistics objects on a truck are temporarily stored near a docking station.

Docking station: a region in which workers place packages, and logistics objects may be placed on an AGV by workers or machines.

Code scanning region: a barcode list is pasted on a logistics object, and the barcode list records logistics object feature information of the logistics object. After workers place the logistics object on an AGV, the AGV needs to travel to the code scanning region to automatically identify the logistics object feature information of the logistics object through the code scanning equipment arranged in the code scanning region, to calculate subsequent tasks.

Path region: a region that may be occupied by an AGV during travelling, and is usually a flat ground.

The logistics object can be understood as an object such as a logistics package.

In the express logistics industry, sorting of express packages refers to classification of mixed logistics packages according to destinations and other rules. With the vigorous development of logistics technologies, manually sorting of logistics packages is no longer suitable. At present, logistics packages may be automatically sorted through a robot automatic sorting operation platform, thereby greatly saving human resources and improving sorting efficiency.

In the embodiments of the specification, a sorting system includes: a server, a plurality of pieces of transportation equipment, a plurality of pieces of object collecting equipment classified according to destinations, and code scanning equipment. The embodiments of the specification are systematically described with reference to FIG. 1A, FIG. 1B, FIG. 1C, FIG. 1D, FIG. 1E, FIG. 1F, and FIG. 1G.

Figure 1A:
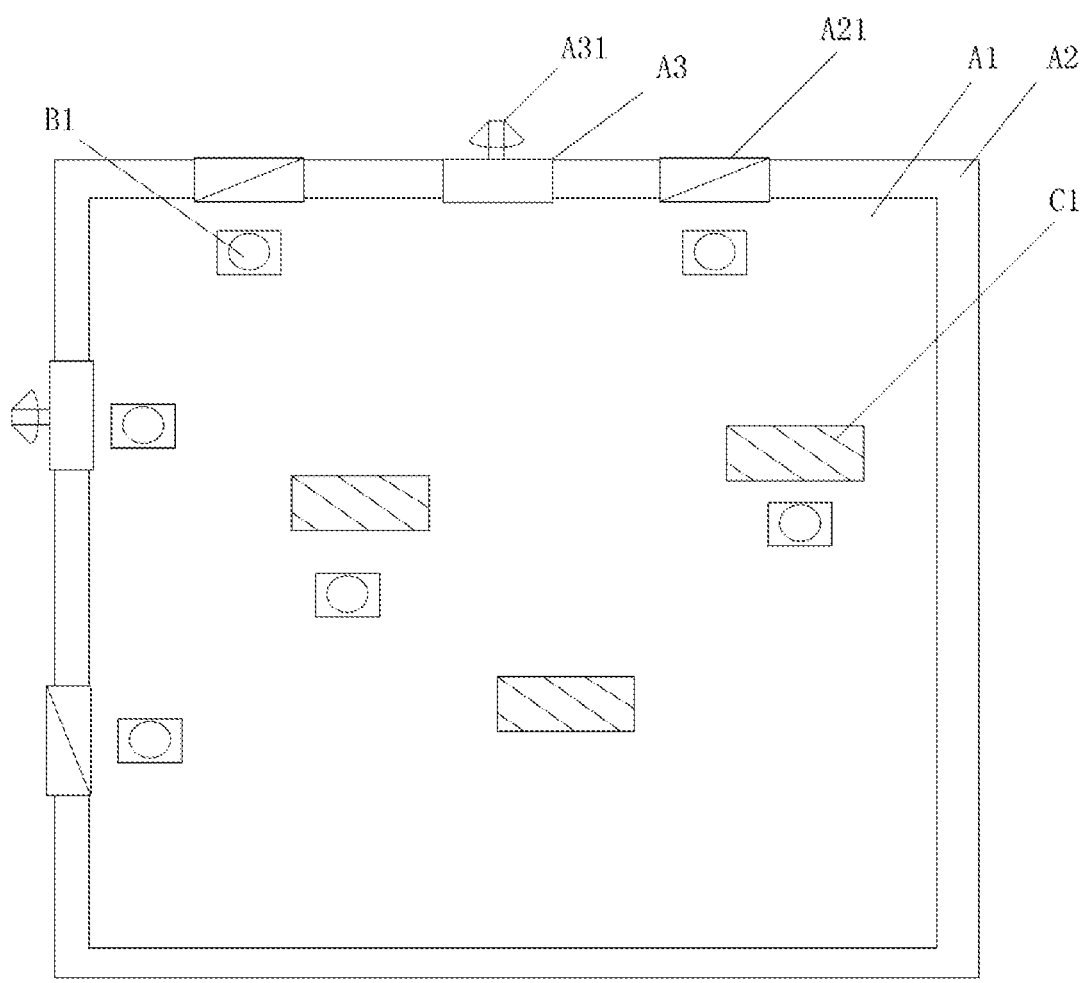
FIG. 1A is a plane schematic diagram of a logistics system, according to an embodiment of the specification.

FIG. 1A is a plane schematic diagram of a logistics system, according to an embodiment of the specification. A sorting site in the figure may be a flat site, and functional regions are divided in this embodiment of the specification. As shown in FIG. 1A, the whole site is divided into a work site path region A1, a loading region A2, and a code scanning region A3. A docking station A21 is set based on the loading region A2, and code scanning equipment A31 is set in the code scanning region A3.

A3 may be other types of information acquisition regions, such as an information acquisition region of a near field communication type. A3 is a near field communication collecting region, and A31 is a label scanning equipment. A label may be set in a logistics package, and the label may carry logistics object feature information.

A plurality of pieces of the transportation equipment B1 (AGV) and the object collecting equipment C1 works in the work site path region A1.

A basic sorting procedure of the sorting system is as follows.

In the docking station A21, a single piece of logistics object is placed on the transportation equipment B1 by humans or machines. After carrying the logistics object, the transportation equipment B1 goes to the code scanning region A3 according to a preset path, and the code scanning equipment A31 scans the code for the logistics object carried by the transportation equipment B1 to acquire logistics object feature information of the logistics object, that is, destination information. In this case, the code scanning equipment A31 sends the logistics object feature information to the server, the server assigns a path to go to the corresponding object collecting equipment C1 to the transportation equipment B1 based on the logistics object feature information. The transportation equipment B1 moves to the object collecting equipment C1 in the work site path region A1 according to this path, and unloads the logistics object into the object collecting equipment C1, thereby completing sorting of the logistics object.

Figure 1B:
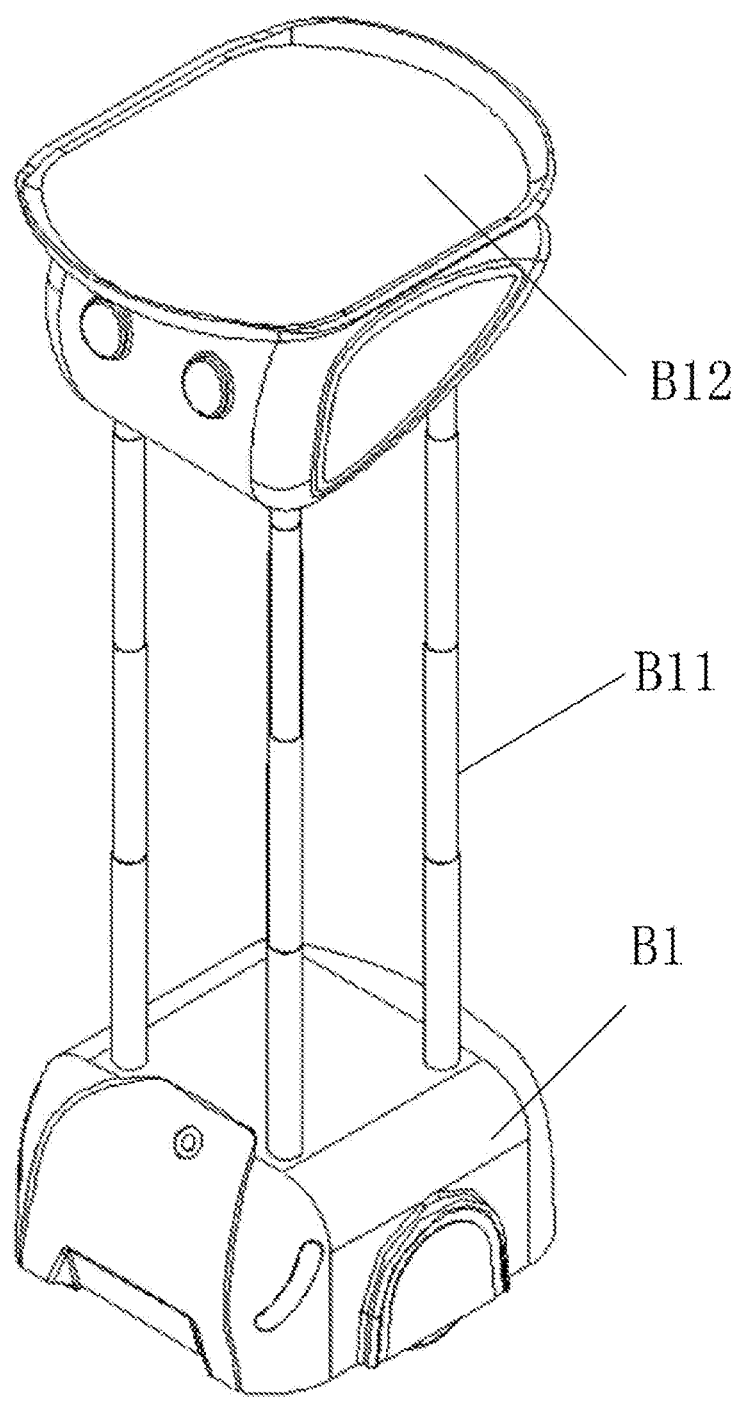
FIG. 1B is a structural schematic diagram of transportation equipment, according to an embodiment of the specification.
Figure 1C:
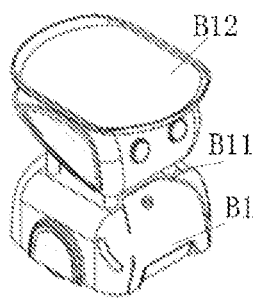
FIG. 1C is a structural schematic diagram of another transportation equipment, according to an embodiment of the specification.
Figure 1D:
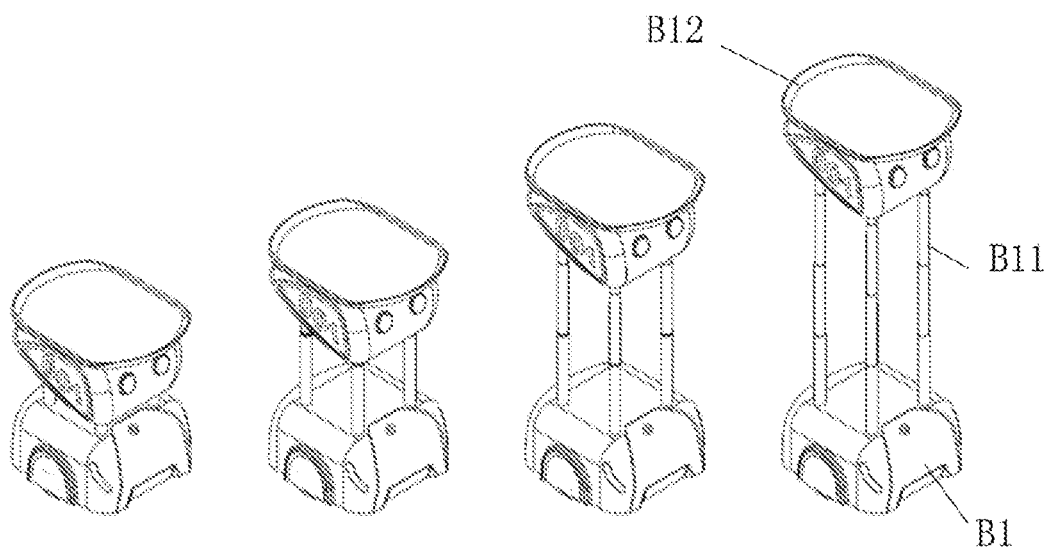
FIG. 1D is a schematic diagram of the operation of a lifting device of the transportation equipment, according to an embodiment of the specification.

FIG. 1B is a structural schematic diagram of transportation equipment, according to an embodiment of the specification. The transportation equipment B1 may include a lifting device B11 and a tray B12, wherein the lifting device B11 can be telescopically lifted, the tray B12 is configured to carry a logistics object, and the tray B12 may also perform a clockwise or counterclockwise flipping action to receive or pour packages. FIG. 1B is a diagram when the transportation equipment is elevated to a target elevation, e.g., a highest elevation. In addition, FIG. 1C is a schematic structural diagram of another transportation equipment, according to an embodiment of the specification. FIG. 1C is a diagram when the transportation equipment is lowered to a lowest elevation. In addition, FIG. 1D is a schematic diagram of operation of a lifting device of the transportation equipment, according to an embodiment of the specification. The transportation equipment B1 may gradually elevate the lifting device B11 from an operation position at the leftmost to an operation position at the rightmost in FIG. 1D, or may gradually lower the lifting device B11 from an operation position at the rightmost to an operation position at the leftmost in FIG. 1D.

In particular, in order to achieve the optimal logistics efficiency, it is generally expected that the transportation equipment B1 operates or travels at a faster speed. However, when a logistics object carried by the tray B12 of the transportation equipment B1 is heavy and the lifting device B11 is elevated to a high elevation, the transportation equipment B1 may collapse due to an unstable center of gravity, thereby resulting in accidents. Therefore, it is necessary to control the lifting device B11 to be elevated or lowered according to the distance data between an operation position (i.e., a current position) and a target position of the transportation equipment B1, to prevent the transportation equipment B1 from collapsing due to the unstable center of gravity.

The transportation equipment B1 may operate in the work site path region A1, or may cross the work site path region A1 as required to operate in the loading region A2 and the code scanning region A3.

Figure 1E:
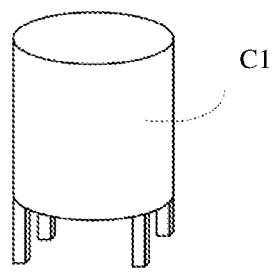
FIG. 1E is a structural schematic diagram of object collecting equipment, according to an embodiment of the specification.

FIG. 1E is a structural schematic diagram of the object collecting equipment, according to an embodiment of the specification. The object collecting equipment C1 is classified according to destinations. For example, a corresponding piece of object collecting equipment 1, object collecting equipment 2, and object collecting equipment 3 may be respectively set for destinations Beijing, Shanghai, and Xi'an. The object collecting equipment 1 specifically carries logistics packages destined for Beijing, the object collecting equipment 2 specifically carries logistics packages destined for Shanghai, and the object collecting equipment 3 specifically carries logistics packages destined for Xi'an. This classification can facilitate a subsequent delivery procedure and improve the logistics efficiency. In addition, the height of the lifting device B11 of the transportation equipment B1 when the lifting device is elevated to the highest elevation and the height of the object collecting equipment C1 may be kept the same, to facilitate pouring of logistics packages. In addition, the object collecting equipment C1 may be moved. For example, after the object collecting equipment C1 reaches the full load capacity, the object collecting equipment C1 may be moved to a bag sewing region to perform a bag sewing operation.

Referring to FIG. 1A, the code scanning region A3 is provided with one or more sets of code scanning equipment A31. The code scanning equipment A31 may be a barcode scanning gun with a specified scanning range. Therefore, when a worker or a machine places a logistics object on the tray B12 of the transportation equipment B1, a surface that is of the logistics object on which a barcode is pasted needs to be placed upward, to match a scanning range of the code scanning equipment A31. After the scanning is completed, the code scanning equipment A31 may send the scanned logistics object feature information to the server, so that the server assigns a corresponding path to the transportation equipment B1 according to the logistics object feature information.

Figure 1F:
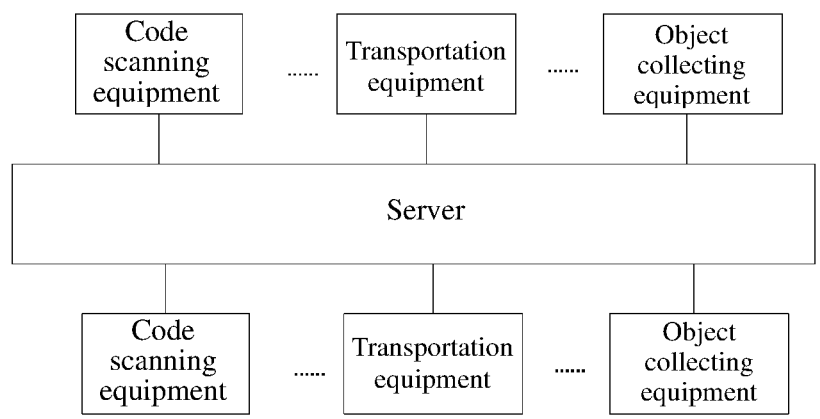
FIG. 1F is a schematic diagram of communication of a server, according to an embodiment of the specification.

FIG. 1F is a schematic diagram of communication of a server, according to an embodiment of the specification. The server may be connected to all of the code scanning equipment, transportation equipment, and object collecting equipment in real time to determine positions of each piece of the transportation equipment and each piece of the object collecting equipment, and the distance data between an operation position and a target position of the transportation equipment. The operations of the transportation equipment are controlled, or a lifting device of the transportation equipment is controlled to be elevated or lowered. Further, the server may assign a path to the transportation equipment. Meanwhile, the server may further receive the logistics object feature information transmitted by the code scanning equipment, to determine the object collecting equipment corresponding to the transportation equipment.

The target position includes at least one of a position of a pickup node, a position of a code scanning node, and a position of a receiving node. The pickup node includes a docking station, the code scanning node includes code scanning equipment, and the receiving node includes object collecting equipment.

Figure 1G:
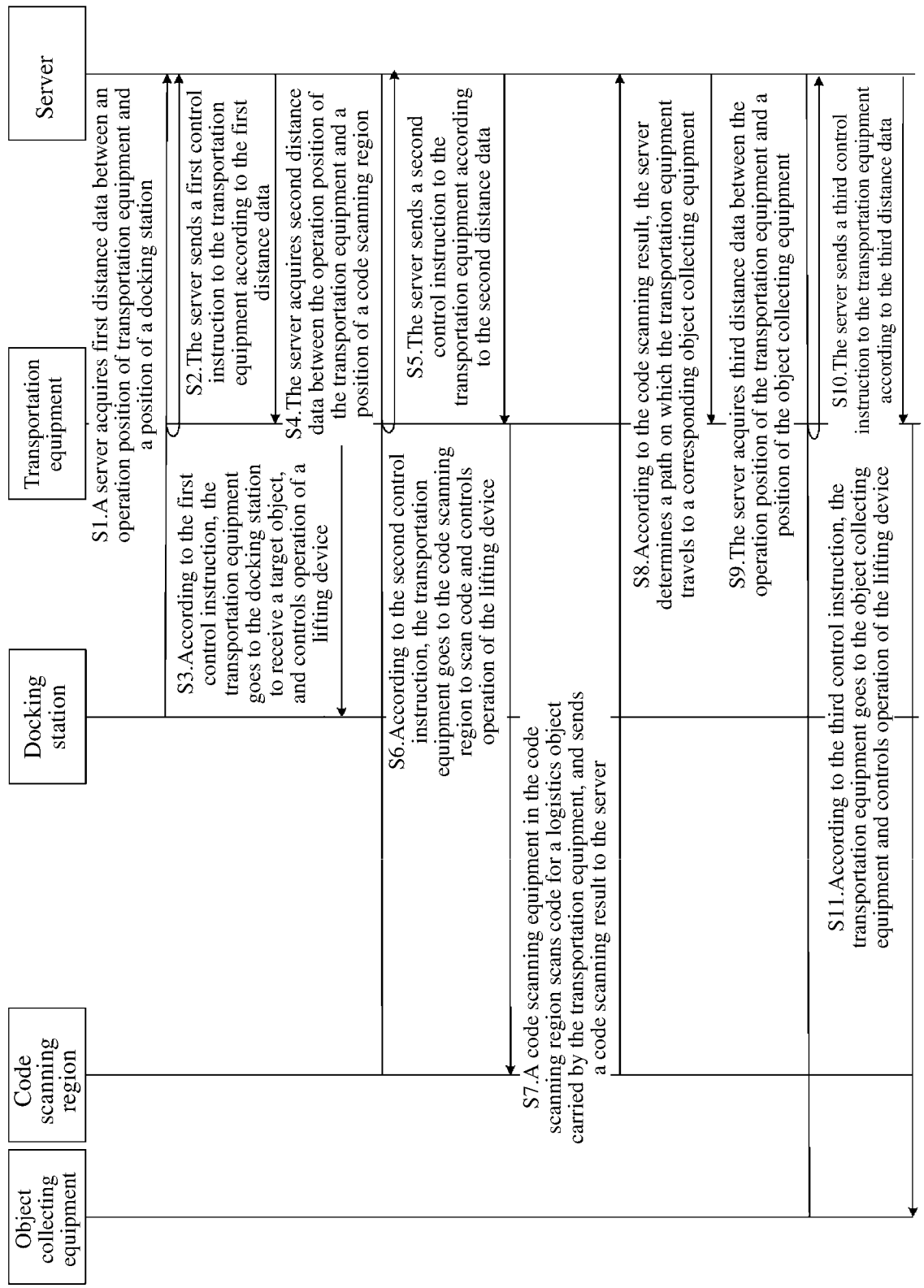
FIG. 1G is a schematic diagram of interactions of an equipment control method, according to an embodiment of the specification.

FIG. 1G is a schematic diagram of interactions of an equipment control method, according to an embodiment of the specification.

S1, a server acquires first distance data between an operation position of transportation equipment and a position of a docking station.

In the specification, surfaces of a path region A1 and a loading region A2 may be covered with a grid of two-dimensional code label coordinates, and each two-dimensional code label coordinate corresponds to one position parameter, such as latitude and longitude information. In addition, a corresponding scanning device may be disposed at the bottom of the transportation equipment B1. The position information of the current position of the transportation equipment B1 is obtained by scanning the two-dimensional code label coordinates of the current position of the transportation equipment B1, and the position information is sent to the server, so that the server may obtain a real-time operation position of the transportation equipment B1. In addition, a positioning module with high accuracy may be further disposed on the transportation equipment B1, and the information about the current position of the transportation equipment B1 is obtained by using the positioning module. This is not limited in this embodiment of the specification.

Further, a database of the server stores real-time position information of the position of each docking station A21, and the server determines the first distance data between the position of the transportation equipment B1 and the position of a docking station A21 according to the operation position of the transportation equipment B1 and the position of the docking station A21.

S2, the server sends a first control instruction to the transportation equipment according to the first distance data.

In the specification, in order to resolve the problem in the existing technologies that workers need to bend to operate and avoid arrangement of a steer framework platform, a lifting device B11 of the transportation equipment B1 may be controlled by the server through the first control instruction to elevate to a target elevation, e.g., a highest elevation, when reaching the docking station A21. The rising action needs to satisfy a specified condition, that is, the first distance data is greater than or equal to a first preset distance and less than or equal to a second preset distance.

In addition, when the first distance data is greater than or equal to a third preset distance (that is, the transportation equipment B1 is far away from the docking station A21, and the third preset distance is greater than the second preset distance), in order to ensure that the center of gravity of the transportation equipment B1 is stable, the lifting device B11 is controlled to perform a lowering action, so that the transportation equipment B1 is enabled to move forward at a faster speed. When the first distance data is less than the third preset distance, the transportation equipment B1 may be enabled to move at a slower speed without operating the lifting device B11. In addition, when the first distance data is greater than or equal to the first preset distance and less than or equal to the second preset distance, the lifting device B11 is controlled to perform a rising action, so that the lifting device is elevated to the highest elevation when reaching the docking station A21.

S3, according to the first control instruction, the transportation equipment goes to the docking station to receive a logistics object, and controls the operation of a lifting device.

Based on the foregoing description, under the control of the first control instruction, the transportation equipment B1 reaches the docking station A21 in the loading region A2. At this time, the lifting device B1 is elevated to the highest elevation. A single piece of logistics object is placed on the transportation equipment B1 by human or machine, and it is ensured that a surface of the logistics object on which a barcode is pasted is placed upward.

S4, the server acquires second distance data between the operation position of the transportation equipment and a position of a code scanning region.

In this step, information about a current real-time position of the transportation equipment B1 is determined by using the same method as in step S1, and the second distance data is calculated according to the position information of the code scanning equipment A31 in the code scanning region A3, and is stored in the server.

The position of the code scanning region A3 may be the position of the code scanning equipment.

S5, the server sends a second control instruction to the transportation equipment according to the second distance data.

In this step, logic on which the second control instruction is based on is the same as that in step S2, and the purpose is to ensure that the center of gravity of the transportation equipment B1 is stable during the operation or travelling. In addition, the lifting device B1 can be elevated to the highest elevation when the transportation equipment B1 reaches the code scanning region.

S6, according to the second control instruction, the transportation equipment goes to the code scanning region to scan the code and controls operation of the lifting device.

S7, the code scanning equipment in the code scanning region scans the code for a logistics object carried by the transportation equipment, and sends a code scanning result to the server.

The code scanning equipment A31 may send the scanned logistics object feature information to the server, so that the server assigns a corresponding path to the transportation equipment B1 according to the logistics object feature information.

The logistics object feature information obtained by scanning the code is usually the destination information, such as Beijing or Shanghai.

S8, according to the code scanning result, the server determines a path on which the transportation equipment travels to the corresponding object collecting equipment.

When a destination corresponding to the logistics object is determined, the server assigns the transportation equipment B1 a path to go to a corresponding object collecting equipment C1. For example, a path to go to the object collecting equipment C1 for Beijing is assigned to the transportation equipment B1 corresponding to the logistics object whose destination is Beijing.

S9, the server acquires third distance data between the operation position of the transportation equipment and the position of the object collecting equipment.

Further, the server may acquire the real-time position information of the object collecting equipment C1 through real-time communication with each piece of object collecting equipment C1, and determines third distance data between the position of the transportation equipment B1 and the position of the object collecting equipment C1 according to the operation position of the transportation equipment B1 and the operation position of the object collecting equipment C1.

S10, the server sends a third control instruction to the transportation equipment according to the third distance data.

In this step, logic on which the third control instruction is based on is the same as that in step S2, and the purpose is to ensure that the center of gravity of the transportation equipment B1 is stable during operation. In addition, the lifting device B1 can be elevated to the highest elevation when the transportation equipment B1 reaches the object collecting equipment.

S11, according to the third control instruction, the transportation equipment goes to the object collecting equipment and controls the operation of the lifting device.

When the transportation equipment B1 reaches the object collecting equipment, the lifting device B1 is elevated to the highest elevation. At this time, through an article pouring operation, the logistics object carried by a tray B12 of the transportation equipment B1 may be poured into the object collecting equipment for collection.

In the existing technologies, sorting transportation has the following disadvantages. (1) Due to a short AGV, workers need to bend each time for placing packages, and therefore it is inconvenient for the workers to operate. (2) Logistics objects need to be poured into the object collecting equipment through a steel framework platform, resulting in a considerable increase in costs. The sorting system provided in the embodiments of the specification effectively overcomes the foregoing disadvantages.

In a first aspect, the sorting system in the embodiments of the specification does not depend on fixed sorting equipment (such as a steel framework sorting platform), all of the transportation equipment move on a same floor, and all of the object sorting equipment and object collecting equipment are also on the same floor. Due to elimination of the steel framework sorting platform and a guide rail, the specification brings the following benefits.

1. There is no requirement for the shape of a site, and the specification can be adapted to sites of any shape. There is no requirement for a clearance space of the site either, and all normal buildings can meet the needs. Therefore, strong expandability is achieved to cope with future business growth.

2. System construction costs and installation cycles are reduced. In the existing technologies, infrastructure consumes most of the system installation time, and is also one of major components of the system costs. The embodiments of the specification can greatly reduce the installation cycles and the system infrastructure costs.

3. The layout can be flexibly adjusted dynamically to improve system efficiency. In the existing technologies, once the sorting equipment is built, the position, the size, and the quantity of the object collecting equipment cannot be modified. However, in the embodiments of the specification, the position, the size, and the quantity of the object collecting equipment can be dynamically adjusted at any time based on the distribution of the objects. For example, if the quantity of objects to be delivered to a specified place is expected to increase significantly, the quantity of the object collecting equipment for that place and the size of the object collecting equipment for that place may be increased, and the position of the object collecting equipment for that place may be adjusted to be closer to an object entrance, thereby improving the system efficiency.

4. The costs of site relocation are significantly reduced. In the existing technologies, a sorting system is customized for a specified site. Once the sorting system is built, it is difficult to migrate the sorting system to another site for use, which increases the costs of site relocation. However, in the embodiments of the specification, only movable equipment such as the transportation equipment, object collecting equipment, object sorting equipment, and information acquiring equipment need to be moved, the installation cycle of a new site is short, and the site can be flexibly expanded without being affected by a site difference, thereby greatly reducing the costs of the site relocation.

In a second aspect, in the embodiments of the specification, an AGV integrated with a lifting device is used to implement automated sorting. Using the distance data between an operation position and a target position of the transportation equipment, the operation of a lifting device of the transportation equipment is controlled, so that the lifting device is elevated to a target elevation, e.g., a highest elevation, when the transportation equipment travels to respective positions of a docking station, a code scanning region, or the object collecting equipment. In this way, workers does not need to bend each time when they place packages, thereby facilitating operations of workers and pouring of packages, and reducing the labor intensity.

Figure 2:
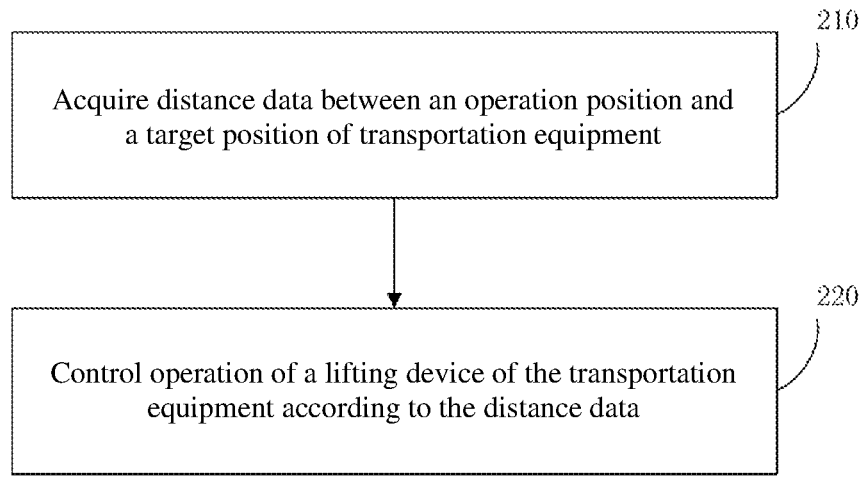
FIG. 2 is a flowchart of steps of an equipment control method on a server side, according to an embodiment of the specification.

FIG. 2 is a flowchart of steps of an embodiment of an equipment control method on a server side according to the specification. The method may specifically include the following steps.

Step 210, acquire distance data between an operation position and a target position of the transportation equipment.

In this embodiment of the specification, a logistics system is provided with servers that control the operation of each piece of equipment, a plurality of pieces of transportation equipment, and a plurality of pieces of object collecting equipment classified according to destinations and code scanning equipment.

In an embodiment, the target position includes at least one of the position of a pickup node, the position of a code scanning node, and the position of a receiving node. The pickup node includes a docking station, the code scanning node includes the code scanning equipment, and the receiving node includes the object collecting equipment.

In this embodiment of the specification, the logistics system is provided with the pickup node, the code scanning node, and the receiving node. The pickup node is a place in which the transportation equipment receives a logistics object, the code scanning node is a place in which feature information of the logistics object is scanned, and the receiving node is a destination to which the transportation equipment transfers the logistics object. As described in the foregoing embodiment, the pickup node may be a docking station A21, and the position of the pickup node is the position of the docking station A21. The code scanning node is code scanning equipment A31, and the position of the code scanning node is the position of the code scanning equipment A31, such as the position of a code scanning region A3 in which the code scanning equipment A31 is located. The receiving node is the aforementioned object collecting equipment C1, and the position of the receiving node is the current position of the aforementioned object collecting equipment C1.

In this embodiment of the specification, the target position may be at least one of the position of the pickup node, the position of the code scanning node, and the position of the receiving node. The target position varies in different transportation procedures.

In this embodiment of the specification, the plurality of pieces of transportation equipment and the plurality of pieces of object collecting equipment classified according to destinations and code scanning equipment may be disposed at a same level such as a same floor.

The logistics object may be an object such as a logistics package.

In particular, referring to FIG. 1A, in this embodiment of the specification, surfaces of a path region A1 and a loading region A2 may be covered with a grid of two-dimensional code label coordinates, and each two-dimensional code label coordinate corresponds to one position parameter, such as latitude and longitude information. In addition, a corresponding scanning device may be disposed on the transportation equipment B1, position information of the current position of the transportation equipment B1 is obtained by scanning the two-dimensional code label coordinates of the current position of the transportation equipment B1. The position information is sent to the server, so that the server obtains the real-time operation position of the transportation equipment B1. In addition, a positioning module with high accuracy may be further disposed on the transportation equipment B1, and the information about the current position of the transportation equipment B1 is obtained by using the positioning module.

Further, a database of the server stores the real-time position information of the position of each docking station A21 and the code scanning equipment A31 in each code scanning region A3. The server may acquire the real-time position information of the object collecting equipment C1 through real-time communication with the object collecting equipment C1, and the server determines the distance data between an operation position and a target position of the transportation equipment B1 according to the operation position and the target position of the transportation equipment B1 (the target position may be the position of the docking station A21, the position of the code scanning equipment A31 in each code scanning region A3, or the position of the object collecting equipment C1).

Step 220, control operation of a lifting device of the transportation equipment according to the distance data.

In practical application, the transportation equipment may have three corresponding target positions: the docking station, the code scanning equipment, and the object collecting equipment.

When the target position of the transportation equipment is the position of the docking station, a distance between the position of the transportation equipment and the position of the docking station may be the first distance data.

When the target position of the transportation equipment is the position of the code scanning equipment, a distance between the position of the transportation equipment and the position of the code scanning equipment may be the second distance data.

When the target position of the transportation equipment is the position of the object collecting equipment, a distance between the position of the transportation equipment and the position of the object collecting equipment may be the third distance data.

A control instruction sent by the server to the transportation equipment for an operation speed of the transportation equipment and/or the lifting device can be triggered only when each of the first distance data, the second distance data, and the third distance data meets a specified condition. In this way, the lifting device can be elevated to a target elevation, a highest elevation, when the transportation equipment reaches the docking station, the code scanning equipment, or the object collecting equipment, and it is also ensured that the transportation equipment operates at a proper speed and has a stable center of gravity during operation.

According to this embodiment of the specification, distance data between an operation position and a target position of transportation equipment is acquired, and operation of a lifting device of the transportation equipment is controlled according to the distance data, so that the lifting device is elevated to a target elevation, e.g., a highest elevation, when the transportation equipment reaches the target position. Since the transportation equipment employs the lifting device, ergonomic requirements are well met and there is no need for workers to bend for handling logistics packages in a docking process, so that the labor intensity of the workers is reduced, and the sorting efficiency of a sorting system is improved. Moreover, logistics objects do not need to be poured into the object collecting equipment through a steer framework platform, so that the setup costs of the sorting system are reduced, and the flexibility of the sorting system is greatly improved.

Figure 3A:
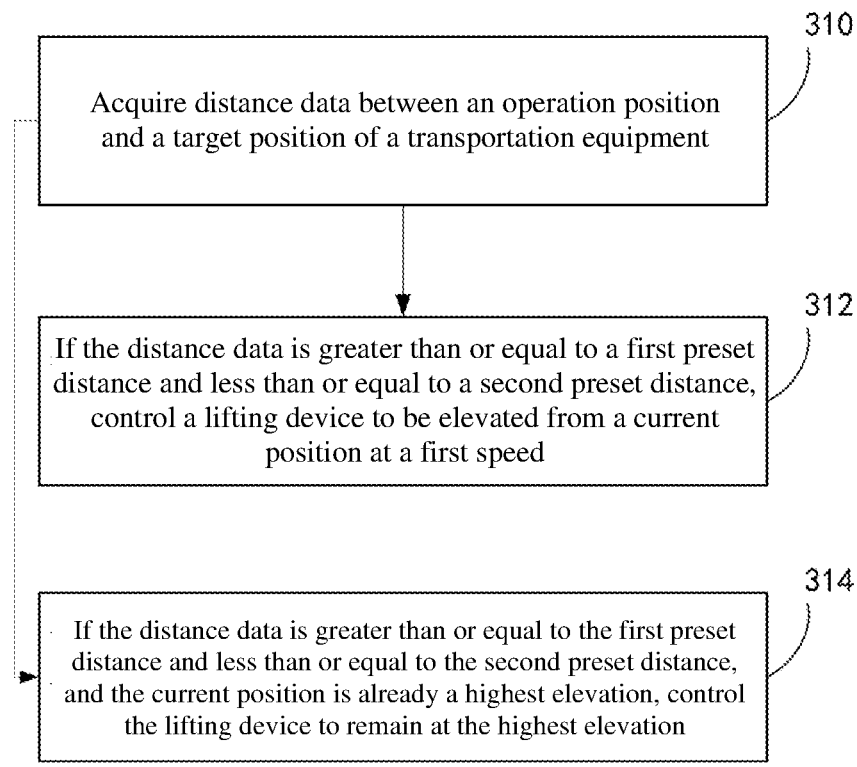
FIG. 3A is a flowchart of steps of an equipment control method on a server side, according to an embodiment of the specification.

FIG. 3A is a flowchart of steps of an embodiment of an equipment control method on a server side according to the specification. The method may specifically include the following steps.

Step 310, acquire distance data between an operation position and a target position of transportation equipment.

This step may refer to step 210. Details are not described herein again.

The transportation equipment may send information about a carried logistics object to a server.

Step 312, if the distance data is greater than or equal to a first preset distance and less than or equal to a second preset distance, control a lifting device to be elevated from a current elevation at a first speed (i.e., an elevating speed).

In this embodiment of the specification, the server may control the transportation equipment to perform some special actions, such as controlling the lifting device of the transportation equipment to be elevated or lowered, and controlling the transportation equipment to operate or travel in a sorting system at a preset speed. A target position corresponding to the transportation equipment may be a docking station, the code scanning equipment, or the object collecting equipment. When the distance data between the transportation equipment and the target position is greater than or equal to the first preset distance and less than or equal to the second preset distance, and if the lifting device of the transportation equipment is at a lowest elevation or not at a highest elevation, the lifting device is controlled to be elevated from the current elevation at the first speed to satisfy that the lifting device is elevated to the highest elevation when the transportation equipment reaches the target position. The first speed is a speed at which the lifting device expands and contracts, and is usually a fixed value.

In an embodiment, the first preset distance $s1=L*v2/v1$, and the second preset distance $s2=L*v2/v1+\Delta s$, wherein L is a total height of the lifting device, v2 is a maximum speed (i.e., a maximum travelling speed) of the transportation equipment, v1 is a lifting speed of the lifting device, and $\Delta s$ is a distance adjustment constant.

The first preset distance may be calculated according to the formula $s1=L*v2/v1$, and the second preset distance may be calculated according to the formula $s2=L*v2/v1+\Delta s$. L is the total height of the lifting device and usually may be 1.2 meters, and the height is an appropriate height for a human body to place a logistics object. v2 is the maximum speed of the transportation equipment, v1 is the lifting speed of the lifting device, and v2 and v1 are obtained based on performance parameters of the transportation equipment and the lifting device included in the transportation equipment. $\Delta s$ is the distance adjustment constant and may be set as required or obtained according to experiments. In this way, the transportation equipment controls rising of the lifting device of the transportation equipment after the distance data falls into a range between s1 and s2 to ensure that the lifting device has reached the highest point when the lifting device reaches the target position.

In an embodiment, the current elevation is the lowest elevation.

The transportation equipment controls rising of the lifting device of the transportation equipment after the distance data falls into the range between s1 and s2 to ensure that the lifting device has reached the highest point when the lifting device reaches the target position.

The current position of the lifting device may not be at the lowest elevation, and the lifting device can be controlled to be elevated when the lifting device is not at the highest elevation.

In practical application, when the lifting device is elevated, a travelling speed of the transportation equipment may be reduced. For example, the travelling speed is reduced from a second speed to a third speed, wherein the second speed is greater than the third speed.

Step 314, if the distance data is greater than or equal to the first preset distance and less than or equal to the second preset distance, and the current elevation is already the highest elevation, control the lifting device to remain at the highest elevation.

In this step, if the distance data is greater than or equal to the first preset distance and less than or equal to the second preset distance, and the current elevation of the lifting device is already the highest elevation, the lifting device remains at the highest elevation until the lifting device travels to the target position.

When the lifting device remains at the highest elevation and travels to the target position, the lifting device may travel at the third speed, and the third speed is less than the second speed.

According to this embodiment of the specification, distance data between an operation position and a target position of the transportation equipment is acquired, and operation of a lifting device of the transportation equipment is controlled according to the distance data, so that the lifting device is elevated to the highest elevation when the transportation equipment reaches the target position. Since the transportation equipment employs the lifting device, ergonomic requirements are well met and there is no need for workers to bend for handling logistics packages in a docking process, so that the labor intensity of the workers is reduced, and the sorting efficiency of a sorting system is improved. Moreover, logistics objects do not need to be poured into the object collecting equipment through a steer framework platform, so that the setup costs of the sorting system are reduced, and the flexibility of the sorting system is greatly improved. In addition, when the transportation equipment reaches a specified target position, it can be ensured that the lifting device is elevated to the highest point, and therefore it is convenient for the operation. For example, when the transportation equipment reaches the position of a docking station, the lifting device is elevated to the highest point, and therefore it is convenient for workers to place logistics objects. For another example, when the transportation equipment reaches the position of object the collecting equipment, the lifting device is elevated to the highest point, and therefore it is convenient to transfer the logistics objects to the object collecting equipment, and the articles can be sorted without a steer framework platform.

Figure 3B:
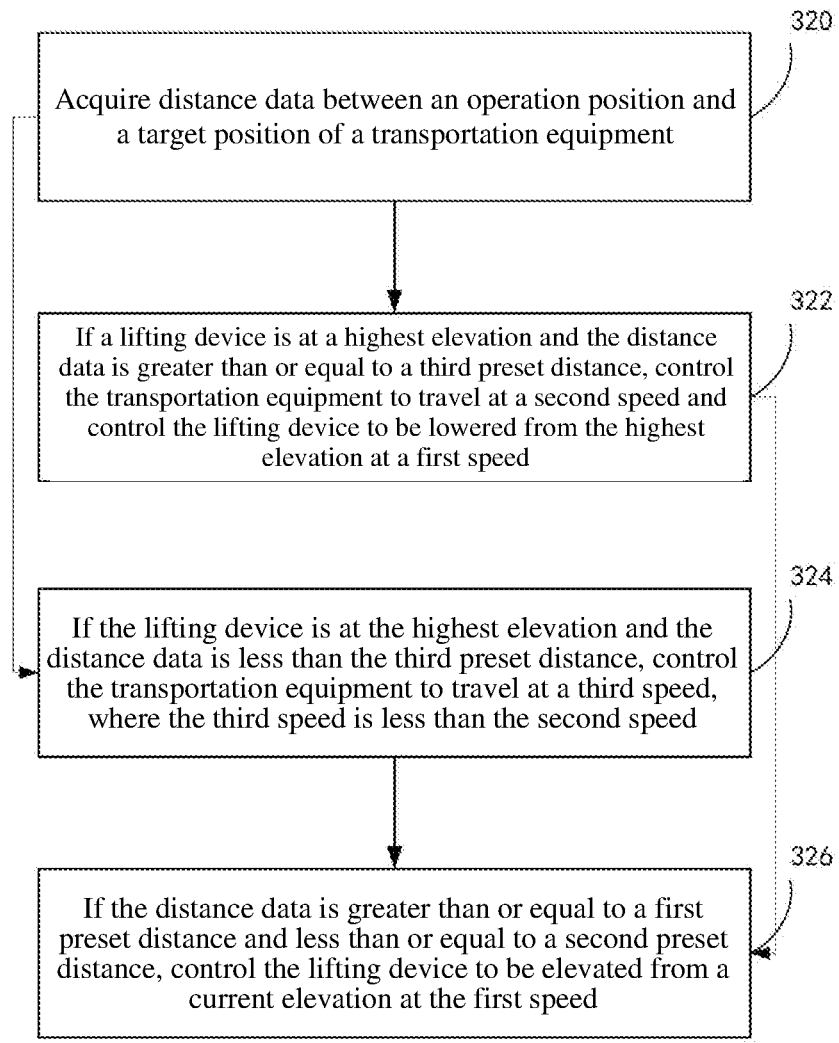
FIG. 3B is a flowchart of steps of another equipment control method on a server side, according to an embodiment of the specification.

FIG. 3B is a flowchart of steps of an embodiment of an equipment control method on a server side according to the specification. The method may specifically include the following steps.

Step 320, acquire distance data between an operation position and a target position of transportation equipment.

This step may refer to step 210. Details are not described herein again.

Step 322, if a lifting device is at a highest elevation and the distance data is greater than or equal to a third preset distance, control the transportation equipment to travel at a second speed and control the lifting device to be lowered from the highest elevation at the first speed.

In practical application, in order to achieve optimal logistics efficiency, it is generally expected that the transportation equipment operates at a faster speed. However, when a logistics object carried by a tray of the transportation equipment is heavy and the lifting device is elevated to the high elevation, the transportation equipment may be collapsed due to an unstable center of gravity, thereby resulting in accidents. Therefore, it is necessary to control the lifting device to be elevated or lowered according to the distance data between the operation position and the target position of the transportation equipment, to prevent the transportation equipment from collapsing due to the unstable center of gravity.

In an embodiment, the third preset distance $s3=2L*v2/v1+\Delta s$, wherein L is a total height of the lifting device, v2 is a maximum speed (i.e., maximum travelling speed) of the transportation equipment, v1 is a lifting speed of the lifting device, and $\Delta s$ is a distance adjustment constant.

In this embodiment of the specification, the third preset distance is usually calculated by $s3=2L*v2/v1+\Delta s$, and the third preset distance is usually greater than a first preset distance and a second preset distance. Therefore, step 322 shows that if the transportation equipment is far away from the target position, when the lifting device is at the highest elevation and the distance data is greater than or equal to the third preset distance, the transportation equipment travels at the faster second speed. In addition, the lifting device is lowered from the highest elevation at the first speed to the lowest elevation to ensure that the transportation equipment has a stable center of gravity when travelling at the faster second speed, and a phenomenon of package overturning does not occur.

It should be noted that in practical application, the transportation equipment can travel at the third speed during lowering of the lifting device, and the transportation equipment can travel at the second speed after the lifting device is lowered to the lowest point, the second speed being greater than the third speed. In this way, a phenomenon of overturning caused by the unstable center of gravity of the transportation equipment loaded with logistics objects due to an excessively high speed of the transportation equipment can be avoided Step 324, if the lifting device is at the highest elevation and the distance data is less than the third preset distance, control the transportation equipment to travel at a third speed, wherein the third speed is less than the second speed.

In this step, if the lifting device is at the highest elevation and the distance data is less than the third preset distance, the transportation equipment is controlled to travel at the slower third speed. In this case, the transportation equipment is closer to the target position, there is no need to speed up but to travel at the slower third speed, and the transportation equipment does not need to control the lifting device to remain at the highest elevation.

Step 326, if the distance data is greater than or equal to a first preset distance and less than or equal to a second preset distance, control the lifting device to be elevated from a current elevation at the first speed.

The step 326 may refer to the foregoing description of step 312. Details are not described herein again.

The following describes a transportation process from a scanning region to object collecting equipment as an example.

For step 310, for example, when the transportation equipment stops in the scanning region, the lifting device of the transportation equipment carries a logistics object, and the lifting device is at the highest point. The code scanning equipment scans feature information of the logistics object and sends the feature information to the server, and the code scanning equipment may further send identity information of the transportation equipment that carries the logistics object to the server. The server determines the object collecting equipment based on the feature information, and then plans a travel path for the transportation equipment according to the target position of the object collecting equipment and the operation position of the transportation equipment. After the planning is completed, the server can determine distance data between the transportation equipment and the object collecting equipment.

Then, the server determines whether the distance data is greater than or equal to the third preset distance. If the distance data is greater than or equal to the third preset distance, step 322 is performed, indicating that the operation position is far away from the target position, an AGV needs to travel at a higher speed to improve sorting efficiency, and a process of elevating the lifting device after lowering it can be completed. Therefore, in order to prevent the AGV from collapsing due to an expressively high center of gravity, the lifting device is lowered to the lowest point and travels at the higher second speed. If the distance data is less than the third preset distance, step 324 is performed, indicating that the operation position is closer to the target position, and the process of elevating the lifting device after lowering it cannot be completed. Therefore, the transportation equipment is controlled to travel at the third speed less than the second speed, and the lifting device remains at the highest elevation.

During travelling of the transportation equipment, the operation or current position of the transportation equipment is continuously sent to the server in the foregoing manner, and the server monitors the distance data between the operation position and the target position in real time. In this case, it is determined whether the distance data is greater than or equal to the first preset distance and less than or equal to the second preset distance, and a current elevation of the lifting device is determined. If the distance data is greater than or equal to the first preset distance and less than or equal to the second preset distance, and the current elevation of the lifting device is not at the highest elevation, step 326 is performed to control the lifting device to be elevated from the current position at the first speed.

The equipment control method provided in this embodiment of the specification does not depend on fixed sorting equipment (such as a steel framework sorting platform), all of the transportation equipment move on a same floor, and all of the object sorting equipment and object collecting equipment are also on the same floor. Due to elimination of the steel framework sorting platform and a guide rail, the specification brings the following benefits.

1. There is no requirement for the shape of a site, and the specification can be adapted to sites of any shape. There is no requirement for a clearance space of the site either, and all normal buildings can meet the needs. Therefore, strong expandability is achieved to cope with future business growth.

2. System construction costs and installation cycles are reduced. In the existing technologies, infrastructure consumes most of the system installation time and is also one of major components of the system costs. The embodiments of the specification can greatly reduce the installation cycles and the system infrastructure costs.

3. The layout can be flexibly adjusted dynamically to improve system efficiency. In the existing technologies, once the sorting equipment is built, the position, the size, and the quantity of the object collecting equipment cannot be modified. However, in the embodiments of the specification, the position, the size, and the quantity of the object collecting equipment can be dynamically adjusted at any time based on the distribution of the objects. For example, if the quantity of objects to be delivered to a specified place is expected to increase significantly, the quantity of the object collecting equipment for that place and the size of the object collecting equipment for that place are increased, and the position of the object collecting equipment for that place is adjusted to be closer to an object entrance, thereby improving the system efficiency.

4. The costs of site relocation are significantly reduced. In the existing technologies, a sorting system is customized for a specified site. Once the sorting system is built, it is difficult to migrate the sorting system to another site for use, which increases the costs of site relocation. However, in the embodiments of the specification, only movable equipment such as the transportation equipment, object collecting equipment, object sorting equipment, and information acquiring equipment need to be moved, the installation cycle of a new site is short, and the site can be flexibly expanded without being affected by a site difference, thereby greatly reducing the costs of the site relocation.

In a second aspect, in the embodiments of the specification, an AGV integrated with a lifting device is used to implement automated sorting. Distance data between an operation position and a target position of the transportation equipment is acquired, and the operation of a lifting device of the transportation equipment is controlled, so that the lifting device is elevated to a target elevation, e.g., a highest elevation, when the transportation equipment travels to respective positions of a docking station, the code scanning equipment, and the object collecting equipment. In this way, workers does not need to bend each time when they place packages, thereby facilitating operations of workers and pouring of packages, and reducing the labor intensity.

Figure 4:
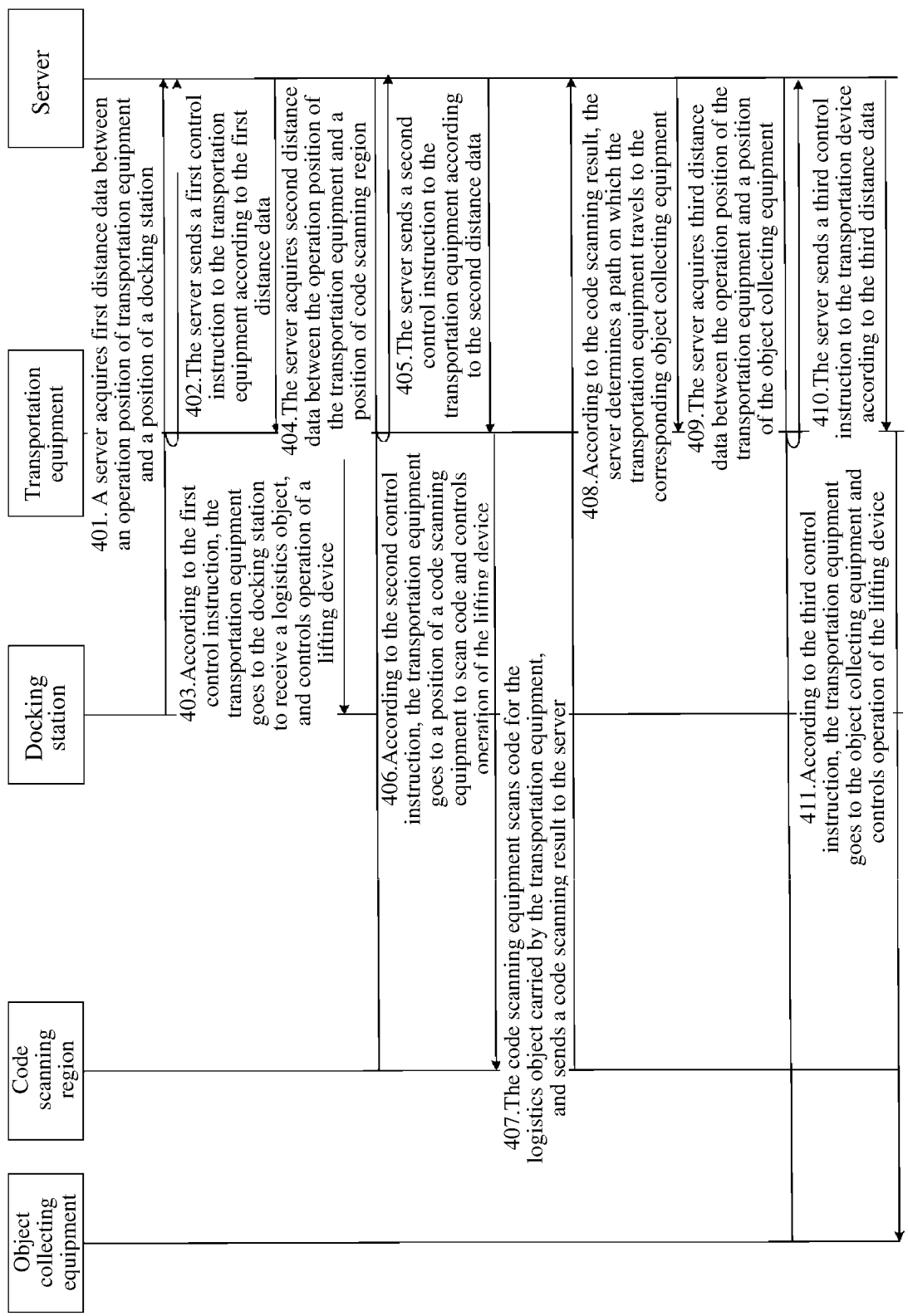
FIG. 4 is a flowchart of steps of an equipment control method at a system level, according to an embodiment of the specification.

FIG. 4 is a flowchart of steps of an embodiment of another equipment control method according to the specification from a system layer. The system layer includes a server, a plurality of pieces of transportation equipment, a plurality of pieces of object collecting equipment that are classified according to destinations, a docking station, and a code scanning region.

FIG. 4 may specifically include the following steps.

401, a server acquires first distance data between an operation position of transportation equipment and a position of a docking station.

402, the server sends a first control instruction to the transportation equipment according to the first distance data.

403, according to the first control instruction, the transportation equipment goes to the docking station to receive a logistics object, and controls the operation of a lifting device.

404, the server acquires second distance data between the operation position of the transportation equipment and the position of the code scanning equipment.

The position of the code scanning equipment may be understood as a position of a code scanning region.

405, the server sends a second control instruction to the transportation equipment according to the second distance data.

406, according to the second control instruction, the transportation equipment goes to the position of the code scanning equipment to scan code and controls the operation of the lifting device.

407, the code scanning equipment scans code for the logistics object carried by the transportation equipment, and sends a code scanning result to the server.

408, according to the code scanning result, the server determines a path on which the transportation equipment travels to the corresponding object collecting equipment.

409, the server acquires third distance data between the operation position of the transportation equipment and the position of the object collecting equipment.

410, the server sends a third control instruction to the transportation device according to the third distance data.

411, according to the third control instruction, the transportation equipment goes to the object collecting equipment and controls the operation of the lifting device.

This embodiment of the specification may refer to the principle similarly described in the foregoing embodiment. Details are not described herein again.

This embodiment of the specification has low requirements on the shape and the space of a site, easy maintenance, a low construction difficulty, a short construction cycle, low costs, and strong flexibility and expandability, and can reduce the labor intensity of workers and improve the sorting efficiency.

It should be noted that, for simplifying the description, the method embodiment is illustrated as a series of actions. However, persons skilled in the art should appreciate that the embodiments of the specification are not limited to the order of the described actions, because according to the embodiments of the specification, some steps may be performed in other orders or simultaneously. In addition, those skilled in the art should understand that the embodiments described in the specification are some embodiments and those actions involved in these embodiments are not necessarily required by the embodiments of the specification.

Figure 5:
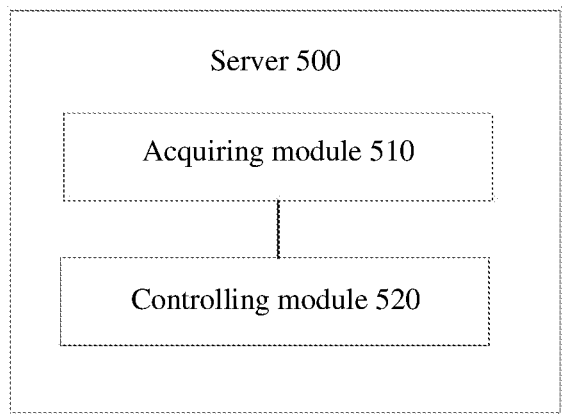
FIG. 5 is a structural diagram of an equipment control device, according to an embodiment of the present application.

FIG. 5 is a structural diagram of an equipment control device (for example, a server 500) of the specification, and the device may specifically include the following modules: an acquiring module 510 configured to acquire distance data between an operation position and a target position of transportation equipment; and a controlling module 520 configured to control the operation of a lifting device of the transportation equipment according to the distance data.

In an embodiment, the target position includes at least one of a position of a pickup node, a position of a code scanning node, and a position of a receiving node. The pickup node includes a docking station, the code scanning node includes code scanning equipment, and the receiving node includes object collecting equipment.

Figure 6A:
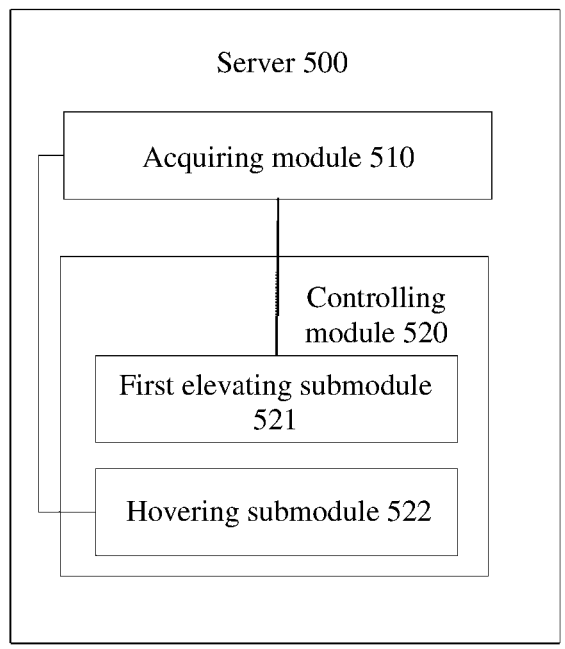
FIG. 6A is a specific structural diagram of another equipment control device, according to an embodiment of the specification.

In an embodiment, referring to FIG. 6A, the controlling module 520 includes: a first elevating submodule 521 configured to: if the distance data is greater than or equal to a first preset distance and less than or equal to a second preset distance, control the lifting device to be elevated from a current elevation at a first speed.

In an embodiment, the current elevation is a lowest elevation.

In an embodiment, the controlling module 520 includes: a hovering submodule 522 configured to: if the distance data is greater than or equal to a first preset distance and less than or equal to a second preset distance, and a current elevation is already the highest elevation, control the lifting device to remain at the highest elevation.

In an embodiment, the first preset distance $s1=L*v2/v1$, and the second preset distance $s2=L*v2/v1+\Delta s$, wherein L is a total height of the lifting device, v2 is a maximum speed of the transportation equipment, v1 is a lifting speed of the lifting device, and $\Delta s$ is a distance adjustment constant.

Figure 6B:
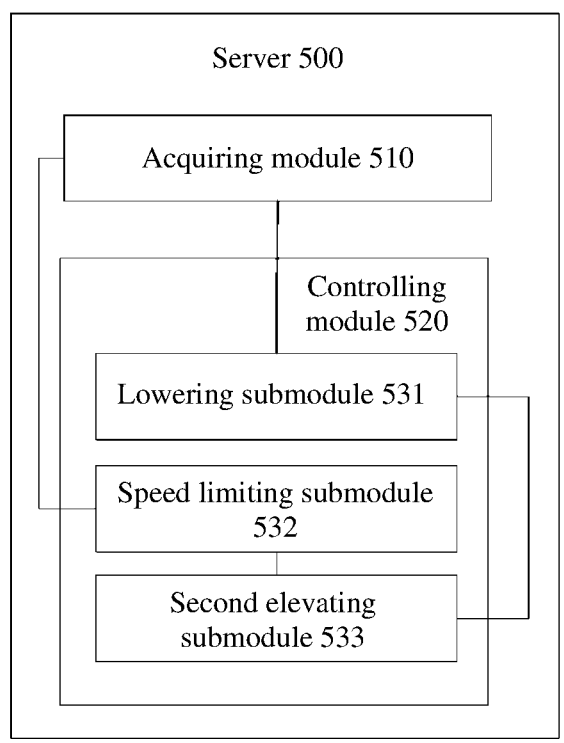
FIG. 6B is a specific structural diagram of another equipment control device, according to an embodiment of the specification.

In an embodiment, referring to FIG. 6B, the controlling module 520 includes: a lowering submodule 531 configured to: if the lifting device is at the highest elevation and the distance data is greater than or equal to a third preset distance, control the transportation equipment to travel at a second speed and control the lifting device to be lowered from the highest elevation at a first speed.

In an embodiment, the controlling module 520 includes: a speed limiting submodule 532 configured to: if the lifting device is at the highest elevation and the distance data is less than the third preset distance, control the transportation equipment to travel at a third speed, wherein the third speed is less than the second speed.

In an embodiment, the third preset distance $s3=2L*v2/v1+\Delta s$, wherein L is a total height of the lifting device, v2 is a maximum speed of the transportation equipment, v1 is a lifting speed of the lifting device, and $\Delta s$ is a distance adjustment constant.

In an embodiment, the controlling module 520 includes: a second elevating submodule 533 configured to: if the distance data is greater than or equal to a first preset distance and less than or equal to a second preset distance, control the lifting device to be elevated from a current position at the first speed.

In an embodiment, the first preset distance $s1=L*v2/v1$, and the second preset distance $s2=L*v2/v1+\Delta s$, wherein L is a total height of the lifting device, v2 is a maximum speed of the transportation equipment, v1 is a lifting speed of the lifting device, and $\Delta s$ is a distance adjustment constant.

According to this embodiment of the specification, distance data between an operation position and a target position of the transportation equipment is acquired, and the operation of a lifting device of the transportation equipment is controlled according to the distance data, so that the lifting device is elevated to the highest elevation when the transportation equipment reaches the target position. Since the transportation equipment employs the lifting device, ergonomic requirements are well met and there is no need for workers to bend for handling logistics packages in a docking process, so that the labor intensity of the workers is reduced, and the sorting efficiency of a sorting system is improved. Moreover, logistics objects do not need to be poured into the object collecting equipment through a steer framework platform, so that the setting costs of the sorting system are reduced, and the flexibility of the sorting system is greatly improved.

In addition, an equipment control method and device provided in the specification may specifically have the following advantages.

1. There is no requirement for the shape of a site, and the specification can be adapted to sites of any shape. There is no requirement for a clearance space of the site either, and all normal buildings can meet the needs. Therefore, strong expandability is achieved to cope with future business growth.

2. System construction costs and installation cycles are reduced. In the existing technologies, infrastructure consumes most of the system installation time and is also one of major components of the system costs. The embodiments of the specification can greatly reduce the installation cycles and the system infrastructure costs.

3. The layout can be flexibly adjusted dynamically to improve system efficiency. In the existing technologies, once the sorting equipment is built, the position, the size, and the quantity of the object collecting equipment cannot be modified. However, in the embodiments of the specification, the position, the size, and the quantity of the object collecting equipment can be dynamically adjusted at any time based on the distribution of the objects. For example, if the quantity of objects to be delivered to a specified place is expected to increase significantly, the quantity of the object collecting equipment for that place and the size of the object collecting equipment for that place are increased, and the position of the object collecting equipment for that place is adjusted to be closer to an object entrance, thereby improving the system efficiency.

4. The costs of site relocation are significantly reduced. In the existing technologies, a sorting system is customized for a specified site. Once the sorting system is built, it is difficult to migrate the sorting system to another site for use, which increases the costs of site relocation. However, in the embodiments of the specification, only movable equipment such as transportation equipment, object collecting equipment, object sorting equipment, and information acquiring equipment need to be moved, the installation cycle of a new site is short, and the site can be flexibly expanded without being affected by a site difference, thereby greatly reducing the costs of the site relocation.

In a second aspect, in the embodiments of the specification, an AGV integrated with a lifting device is used to implement automated sorting. Distance data between an operation position and a target position of the transportation equipment is acquired, and the operation of a lifting device of the transportation equipment is controlled, so that the lifting device is elevated to a target elevation, e.g., a highest elevation, when the transportation equipment travels to respective positions of a docking station, code scanning equipment, and object collecting equipment. In this way, workers does not need to bend each time when they place packages, thereby facilitating operations of workers and pouring of packages, and reducing the labor intensity.

An apparatus embodiment is basically similar to a method embodiment, and therefore is described briefly. The related parts may refer to the part of the descriptions in the method embodiment.

Figure 7:
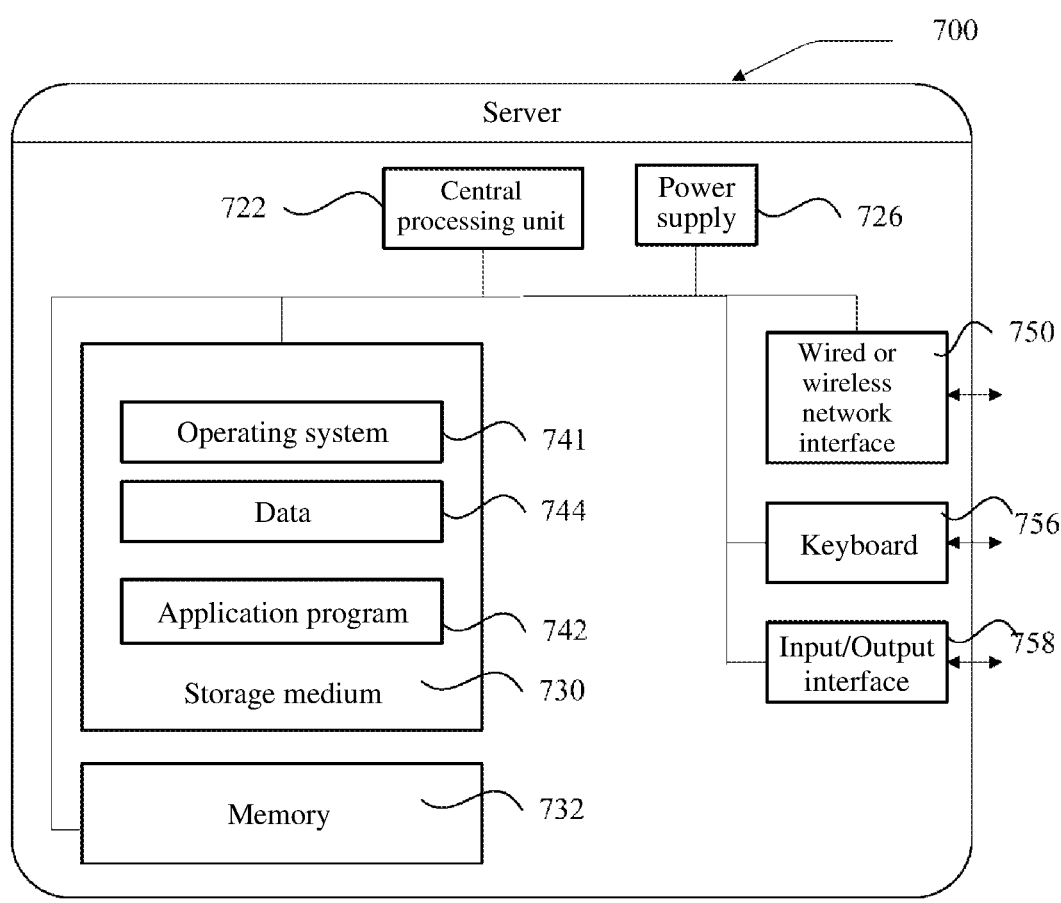
FIG. 7 is a schematic diagram of a hardware structure of a device, according to another embodiment of the specification.

FIG. 7 is a schematic structural diagram of a server, according to an embodiment of the specification. Referring to FIG. 7, a server 700 may be configured to implement the equipment control method provided in the foregoing embodiment. The server 700 may vary considerably depending on configuration or performance, and may include one or more central processing units (CPU) 722 (for example, one or more processors), a memory 732, and one or more storage media 730 (for example, one or more massive storage devices) storing an application program 742 or data 744. The memory 732 and the storage medium 730 may be transitory storage or persistent storage. The program stored in the storage medium 730 may include one or more modules (not shown in the figure), each module including a series of instruction operations on the server. Still further, the central processing unit 722 may be configured to communicate with the storage medium 730 to execute the series of instruction operations in the storage medium 730 on the server 700.

The server 700 may further include one or more power supplies 726, one or more wired or wireless network interfaces 750, one or more input/output interfaces 758, one or more keyboards 756, and/or one or more operating systems 741 such as Windows Server™, Mac OS X™, Unix™, Linux™, and FreeBSD™. The central processing unit 722 may execute instructions of the following operations on the server 700: acquiring distance data between an operation position and a target position of transportation equipment; and controlling operation of a lifting device of the transportation equipment according to the distance data.

In an embodiment, the central processing unit 722 may execute the foregoing instructions executed on the server side on the server 700.

Other devices may also have the structure shown in FIG. 7 and execute the instructions of the method corresponding to the device.

An embodiment of the specification provides a device, including one or more machine-readable media storing an instruction, the instruction, when executed by the one or more processors, causing the device to perform an equipment control method.

An embodiment of the specification further provides one or more machine-readable media storing an instruction, when the instruction is executed by one or more processors, an equipment control method being performed.

Figure 8:
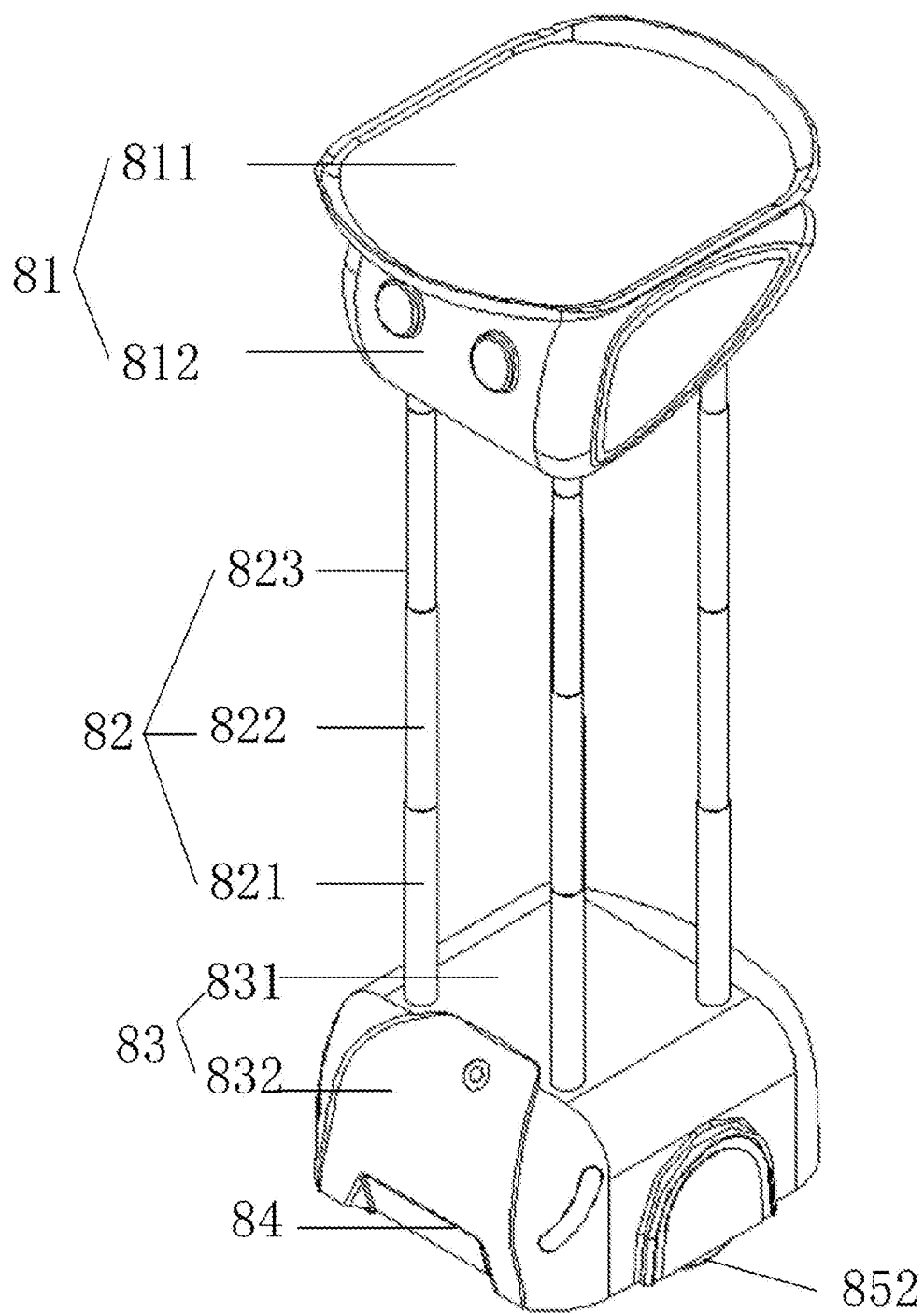
FIG. 8 is a specific schematic structural diagram of the transportation equipment, according to an embodiment of the specification.

FIG. 8 is a structural schematic diagram of transportation equipment, according to an embodiment of the specification, and the transportation equipment may specifically include:

a carrying member 81, a lifting member 82, a vehicle body member 83, one end of the lifting member 82 being connected to the vehicle body member 83, the other end of the lifting member 82 being connected to the carrying member 81, and the lifting member 82 being configured to elevate the carrying member 81 or lower the carrying member 81.

In this embodiment of the specification, in a docking station of a logistics sorting system, the lifting member 82 of the transportation equipment is at a highest elevation. In this case, a single piece of logistics object is placed on the carrying member 81 of the transportation equipment by human or machine. After carrying the logistics object, the transportation equipment goes to a code scanning region according to a preset path to scan code, and moves to object collecting equipment according to a code scanning result. When the transportation equipment is located at the object collecting equipment, the lifting member 82 is also at the highest elevation, and the logistics object is unloaded and poured into the object collecting equipment through the carrying member 81, thereby completing sorting of the logistics object.

As shown in FIG. 8, the lifting member 82 can be lifted and retracted. The lifting member 82 may specifically include three telescopic tubes: a telescopic tube 821, a telescopic tube 822, and a telescopic tube 823 whose diameters decrease in order. The telescopic tube 821, the telescopic tube 822, and the telescopic tube 823 are sequentially sleeved and connected to complete assembly of the lifting member 82, and are retracted under driving of electricity. FIG. 8 is a schematic diagram of the transportation equipment when the lifting member 82 is extended to the highest elevation. In addition, FIG. 1C is a diagram when the lifting member is lowered to a lowest elevation. Further, FIG. 1D is a schematic diagram of operation of a lifting device of the transportation equipment, according to an embodiment of the specification. The transportation equipment can gradually elevate the lifting member from an operation position at the leftmost to an operation position at the rightmost in FIG. 1D, or can gradually lower the lifting member from an operation position at the rightmost to an operation position at the leftmost in FIG. 1D.

The carrying member 81 is configured to carry a logistics object, and the carrying member 81 may further pour the logistics object into the object collecting equipment. FIG. 1C is a diagram when the transportation equipment is lowered to a lowest elevation. In addition, FIG. 1D is a schematic diagram of the operation of a lifting device of the transportation equipment, according to an embodiment of the specification. The transportation equipment B1 may gradually elevate the lifting device B11 from an operation position at the leftmost to an operation position at the rightmost in FIG. 1D, or may gradually elevate the lifting device B11 from an operation position at the rightmost to an operation position at the leftmost in FIG. 1D.

The vehicle body member 83 may be provided with a moving device (a wheel, a track, or the like) configured to drive the transportation equipment to move.

The specification provides a transportation device on which a carrying member, a lifting member, and a vehicle body member are disposed. One end of the lifting member is connected to the vehicle body member, the other end of the lifting member is connected to the carrying member, and the lifting member is configured to elevate the carrying member or lower the carrying member. Since the transportation equipment employs the lifting device, a working height of transportation equipment meets ergonomic requirements and there is no need for workers to bend for handling logistics packages in a docking process, so that the labor intensity of workers is reduced, and the sorting efficiency of a sorting system is improved. Moreover, logistics objects do not need to be poured into object collecting equipment through a steer framework platform, so that the setting costs of the sorting system are reduced, and the flexibility of the sorting system is greatly improved.

In an embodiment, referring to FIG. 8, the carrying member 81 includes a tray 811 and a pouring control member 812. One side of the pouring control member 812 is connected to the lifting member 82, the other side of the pouring control member 812 facing away from the lifting member 82 is connected to the tray 811, and the pouring control member 812 controls the tray 811 to be elevated or lowered with one end of the tray 811 as an axis.

Figure 9:
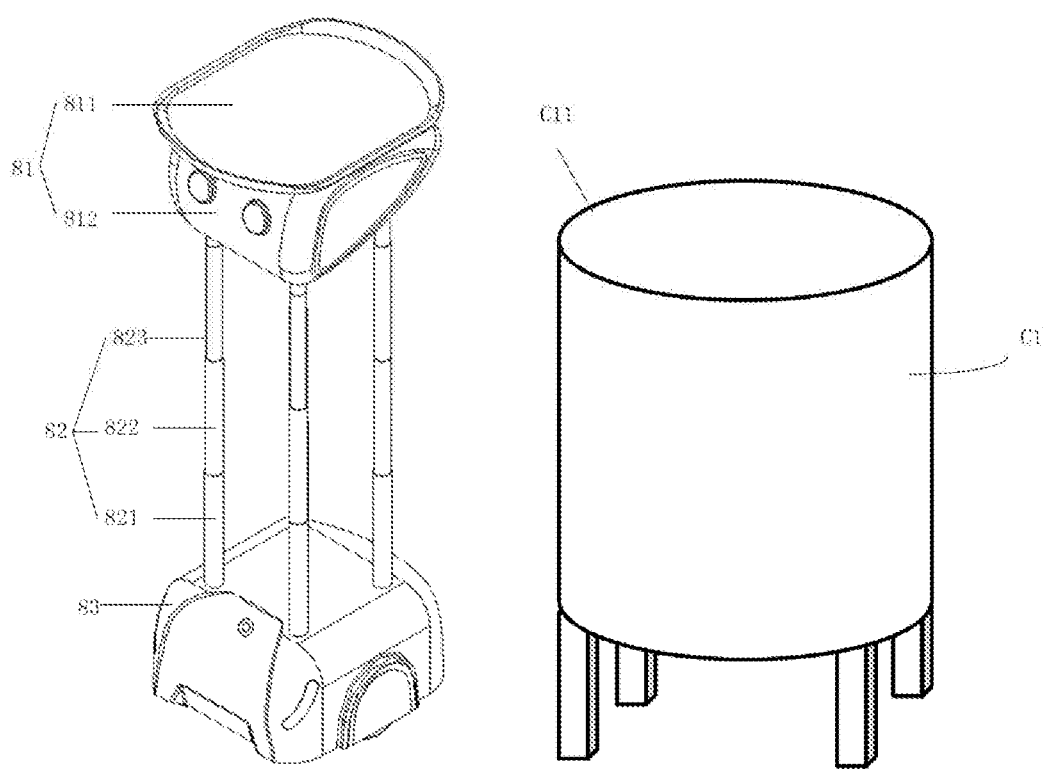
FIG. 9 is a schematic diagram of cooperation between the transportation equipment and object collecting equipment, according to an embodiment of the specification.

In an embodiment, referring to FIG. 9, after the lifting member 82 is elevated to a highest elevation, a height of the tray 811 is higher than a height of a logistics object entrance C11 of the object collecting equipment C1.

In this embodiment of the specification, when the transportation equipment moves to the corresponding object collecting equipment C1, the lifting member 82 of the transportation equipment is elevated to the highest elevation, and a maximum lifting height of the lifting member 82 needs to be greater than the height of the logistics object entrance C11 of the object collecting equipment C1, so that the height of the tray 811 can be greater than the height of the logistics object entrance C11 of the object collecting equipment C1. If the height of the tray 811 is less than the height of the logistics object entrance C11 of the object collecting equipment C1, it is inconvenient to pour a logistics object, and a problem of pouring failure occurs.

Figure 10:
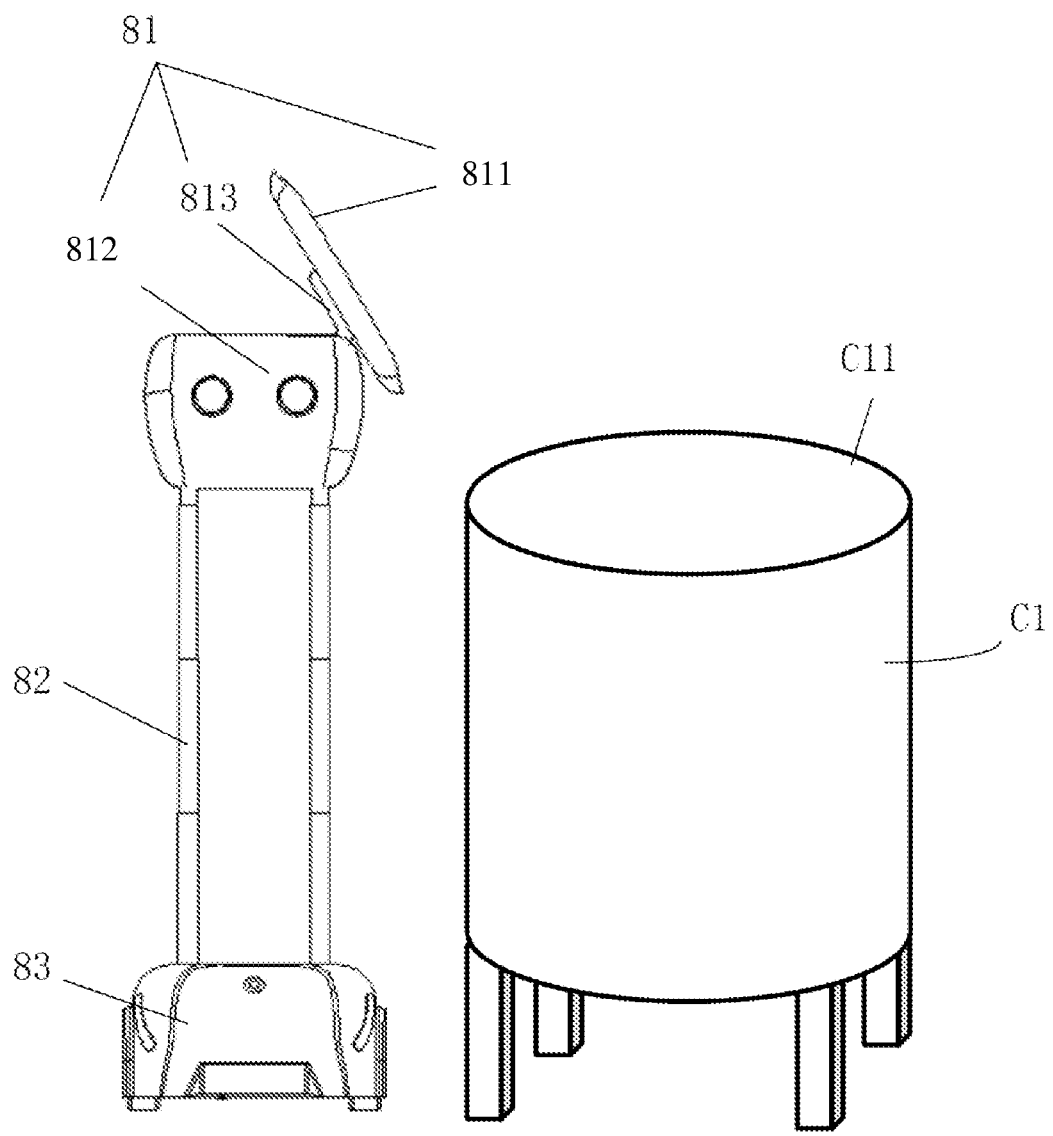
FIG. 10 is a schematic diagram of cooperation between another transportation equipment and the object collecting equipment, according to an embodiment of the specification.

In particular, when the transportation equipment just moves to the corresponding object collecting equipment C1, the tray 811 carries a logistics object and is in a horizontal position. Referring to FIG. 10, in order to facilitate the logistics object to enter the logistics object entrance C11, one side of the pouring control member 812 may be connected to the lifting member 82, and the other side of the pouring control member 812 facing away from the lifting member 82 is connected to the tray 811 through a rotating shaft support 813, so that the pouring control member 812 can drive the rotating shaft support frame 813 in FIG. 10 to rotate clockwise or counterclockwise, and to drive the tray 811 to be elevated or lowered with one end of the tray 811 as an axis. When the transportation equipment just moves to the corresponding object collecting equipment C1, the posture needs to be adjusted so that the logistics object can slide into the logistics object entrance C11 of the object collecting equipment C1 when the tray 811 is flipping.

Figure 11:
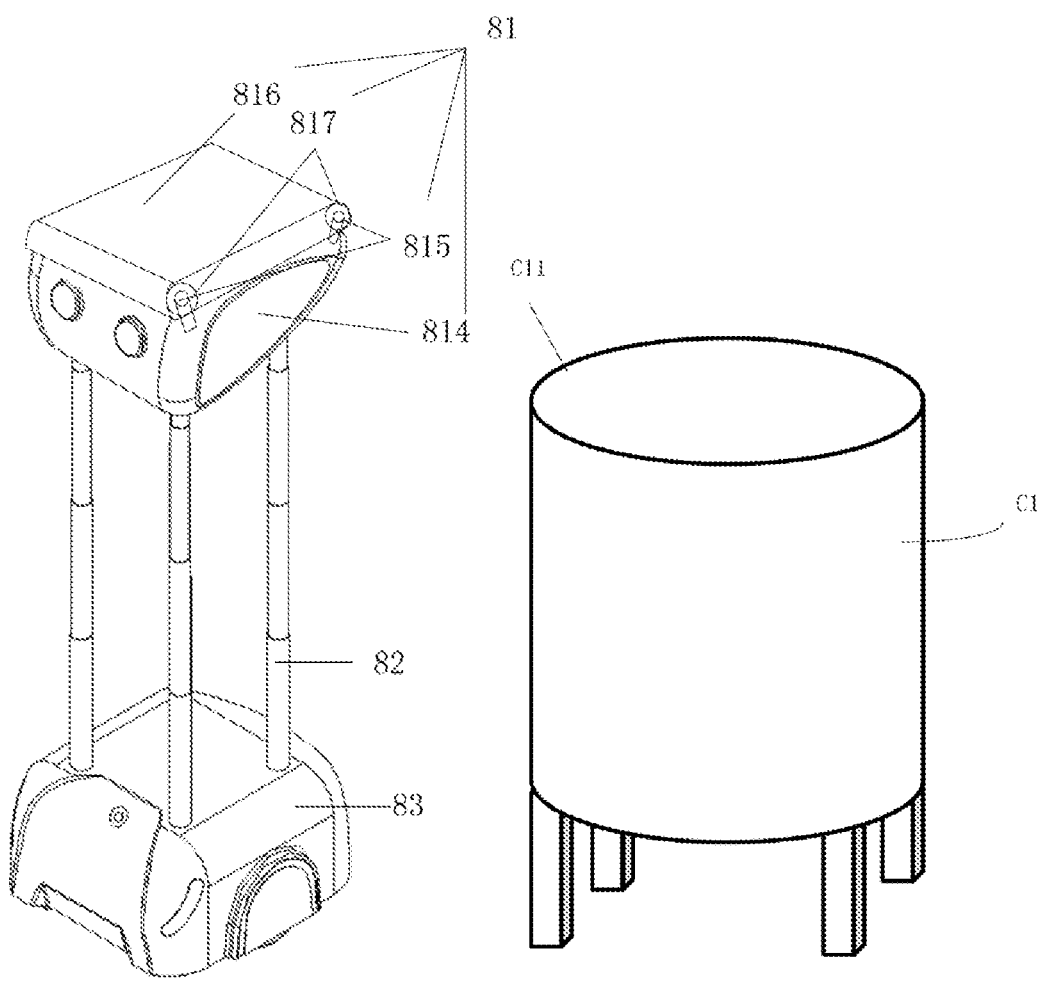
FIG. 11 is a structural schematic diagram of another transportation equipment, according to an embodiment of the specification.

In an embodiment, FIG. 11 is a structural schematic diagram of another transportation equipment, according to an embodiment of the specification. The carrying member 81 includes a conveyor belt mounting table 814, a conveyor belt fixing shaft 815, a conveyor belt 816, and a conveyor belt wheel 817. The conveyor belt mounting table 814 is connected to the lifting member 82, the conveyor belt fixing shaft 815 is disposed on an inner ring of the conveyor belt wheel 817, both ends of the conveyor belt fixing shaft 815 are fixedly connected to the conveyor belt mounting table 814, and an outer ring of the conveyor belt wheel 817 is connected to an inner side of the conveyor belt 816. After the lifting member 82 is elevated to the highest elevation, a plane in which the conveyor belt 816 is located is at least higher than the logistics object entrance C11 of the object collecting equipment C1.

In this embodiment of the specification, the transportation equipment may pour the logistics object into the logistics object entrance C11 of the object collecting equipment C1 through conveyor belt transportation. In particular, the conveyor belt wheel 817 is fixed on the conveyor belt mounting table 814 by the conveyor belt fixing shaft 815, and the conveyor belt wheel 817 may be driven by a motor to rotate clockwise or counterclockwise, so that the conveyor belt 816 connected to the outer rim of the conveyor belt wheel 817 moves clockwise or counterclockwise. In a docking station of a logistics sorting system, the lifting member 82 of the transportation equipment is at the highest elevation. In this case, the conveyor belt wheel 817 does not move, and the conveyor belt 816 is stationary. A single piece of logistics object is placed on a surface of the conveyor belt 816 by human or machine, and when the transportation equipment just moves to the corresponding object collecting equipment C1, the conveyor belt wheel 817 is driven to rotate, to drive the conveyor belt 816 to move, so that the logistics object placed on the conveyor belt 816 is poured into the logistics object entrance C11. The moving direction of the conveyor belt 816 needs to face the logistics object entrance C11, so that the logistics object can be accurately poured into the logistics object entrance C11.

Figure 12:
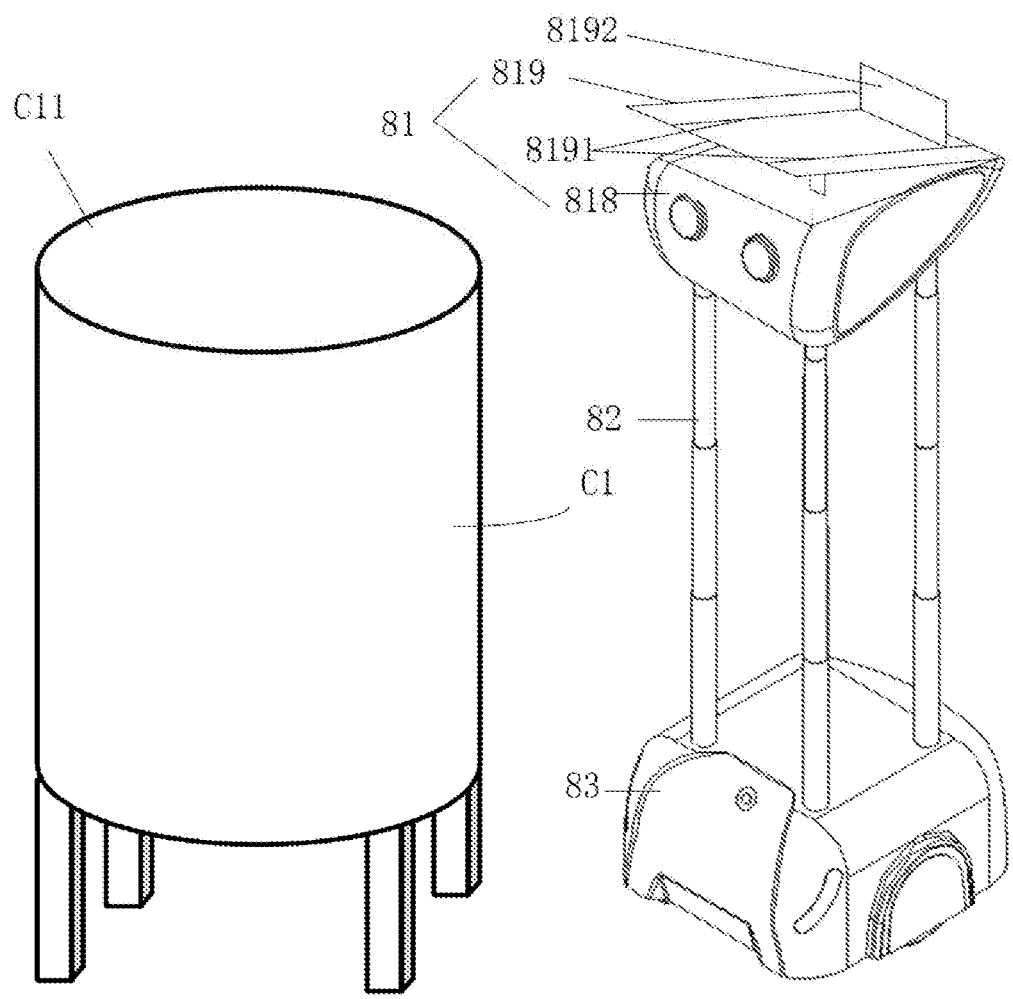
FIG. 12 is a structural schematic diagram of another transportation equipment, according to an embodiment of the specification.

In an embodiment, FIG. 12 is a structural schematic diagram of another transportation equipment, according to an embodiment of the specification. The carrying member 81 includes a carrier 818, an ejection tray 819, ejection slide rails 8191, and an ejection baffle 8192. The carrier 818 is connected to the lifting member 82, the ejection tray 819 is disposed on one side of the carrier 818 facing away from the lifting member 82, and a plane in which the ejection tray 819 is located and a plane in which the carrier 818 is located form a preset angle. The ejection slide rails 8191 are disposed on one side of the ejection tray 819 facing away from the carrier 818, and the ejection baffle 8192 is disposed on the ejection slide rails 8191, to move along the ejection slide rails 8191 and eject a logistics object carried by the ejection tray 819 to a logistics object entrance C11 of the object collecting equipment C1.

In this embodiment of the specification, the transportation equipment may pour the logistics object into the logistics object entrance C11 of the object collecting equipment C1 through ejection transportation. In particular, the ejection tray 819 may carry the logistics object, and one end of the ejection tray 819 is connected to the carrier 818 through a support rod, so that a height of one end of the ejection tray 819 is higher than a height of the other end of the ejection tray 819. In addition, the ejection baffle 8192 may move along the ejection slide rails 8191 under electric driving, and the ejection baffle 8192 is at the other end of the ejection tray 819 with a lower height in a reset state. In a docking station of a logistics sorting system, the lifting member 82 of the transportation equipment is at the highest elevation. In this case, the ejection baffle 8192 is in the reset state, and a single piece of logistics object is placed on a surface of the ejection tray 819 by human or machine, so that the ejection baffle 8192 can press against the logistics object and prevent the logistics object from falling. When the transportation equipment just moves to the corresponding object collecting equipment C1, the transportation equipment moves along the ejection slide rails 8191 through the ejection baffle 8192 to pour the logistics object placed on the ejection tray 819 into the logistics object entrance C11. After the pouring is completed, the ejection baffle 8192 is reset. It should be noted that one end of the ejection tray 819 with a higher height needs to face the logistics object entrance C11, so that the logistics object can be accurately poured into the logistics object entrance C11.

In an embodiment, referring to FIG. 8, the transportation equipment further includes a processor, a memory, and a wireless communication module. The lifting member 82 includes a lifting driver (not shown in FIG. 8), and the vehicle body member 83 includes a travelling driver (not shown in FIG. 8). The processor is respectively connected to the wireless communication module, the memory, the lifting driver, and the travelling driver.

In an embodiment, the processor, the memory, and the wireless communication module are mounted in the vehicle body member 83 or the carrying member 81.

In this embodiment of the specification, the wireless communication module may communicate with a server, and receive a control instruction sent by the server or send data to the server, the memory may store data, and the processor may process the control instruction sent by the server to drive the transportation equipment to operate. In addition, the travelling driver and the lifting driver may be connected to a power supply and driven by electricity. The travelling driver is configured to drive the vehicle body member 83 to move, and the lifting driver is configured to drive the lifting member 82 to be elevated or lowered.

In an embodiment, the lifting member is an electric push rod or a scissor lifting device.

Figure 13:
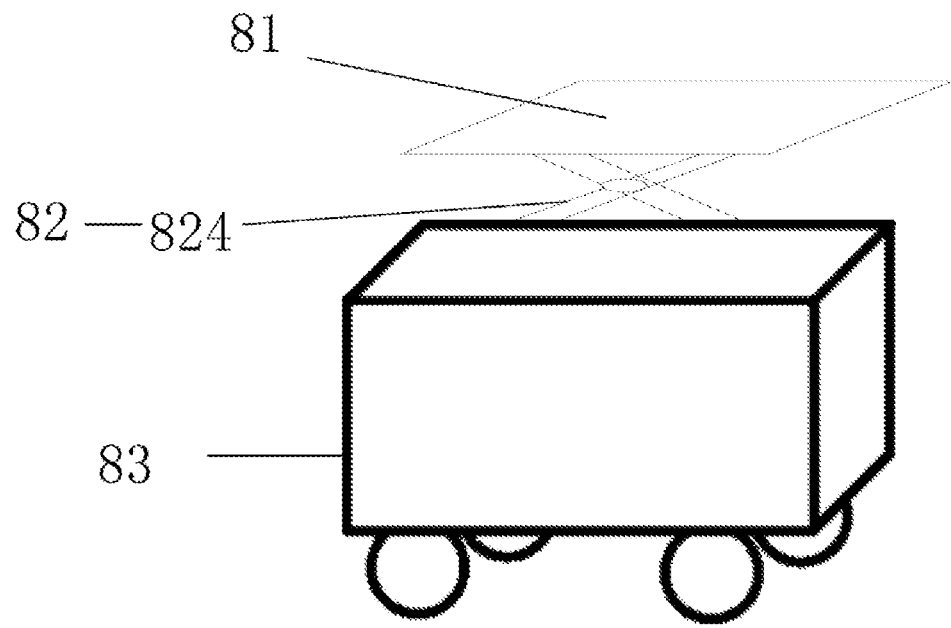
FIG. 13 is a structural schematic diagram of another transportation equipment, according to an embodiment of the specification.

In this embodiment of the specification, the transportation equipment shown in FIG. 8 uses a lifting member of an electric push rod type. The lifting member 82 may specifically include three telescopic tubes: a telescopic tube 821, a telescopic tube 822, and a telescopic tube 823 whose diameters decrease in order. The telescopic tube 821, the telescopic tube 822, and the telescopic tube 823 are sequentially sleeved and connected to complete assembly of the lifting member 82, and are retracted under driving of electricity. In addition, FIG. 13 is a schematic structural diagram of another transportation equipment, according to an embodiment of the specification. The transportation equipment shown in FIG. 13 uses a scissor lifting member. A scissor bracket 824 is driven to expand or retract, so that the carrying member 81 connected to the scissor bracket 824 is elevated or lowered. Certainly, other types of lifting members may also be used in this embodiment of the specification, and are not limited in this embodiment of the specification.

In an embodiment, referring to FIG. 8, one side of the vehicle body member 83 away from the lifting member 82 is provided with a graphic coding scanning device 84, and the graphic coding scanning device 84 is connected to the processor.

In this embodiment of the specification, surfaces of a path region and a loading region of a sorting system may be covered with a grid of two-dimensional code label coordinates, and each two-dimensional code label coordinate corresponds to one position parameter, such as latitude and longitude information. In addition, the graphic coding scanning device 84 may be disposed on one side of the vehicle body member 83 away from the lifting member 82, position information of a current position of the transportation equipment is obtained by scanning two-dimensional code label coordinates of the current position of the transportation equipment by using the graphic coding scanning device 84, and the position information is sent to the processor, so that the processor obtains a real-time operation position of the transportation equipment.

Figure 14A:
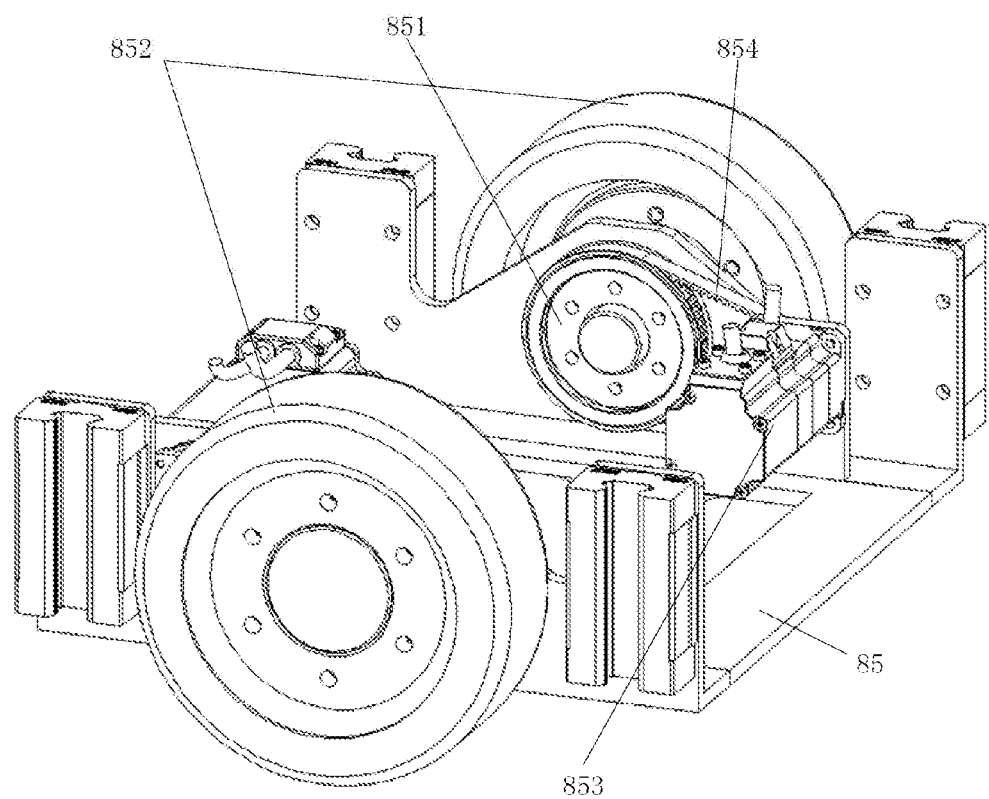
FIG. 14A is a structural schematic diagram of a chassis, according to an embodiment of the specification.
Figure 14B:
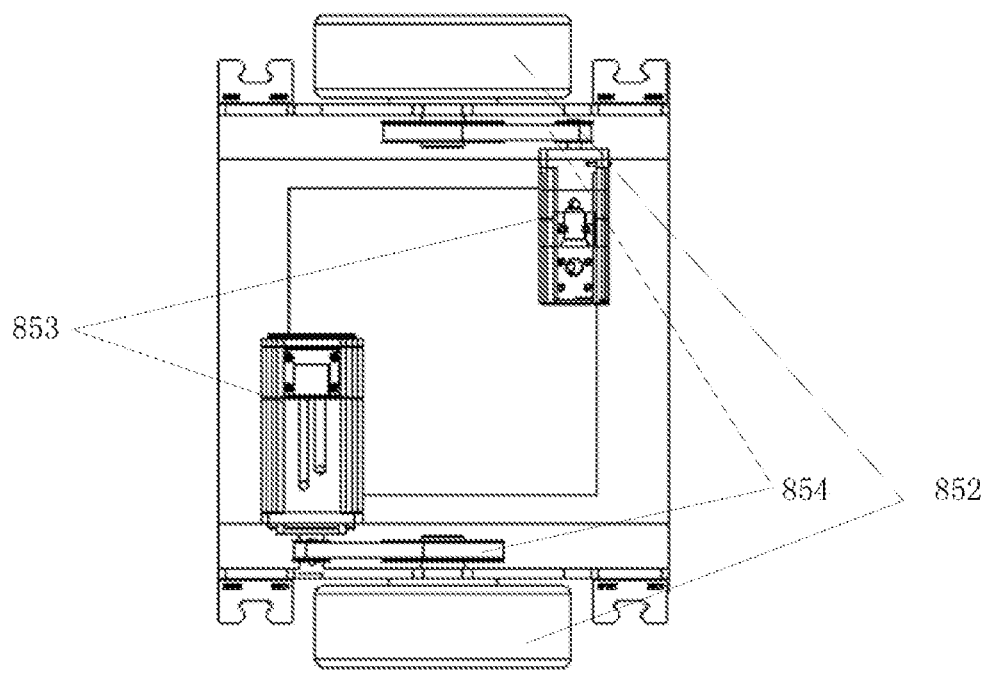
FIG. 14B is a top view of a chassis, according to an embodiment of the specification.
Figure 14C:
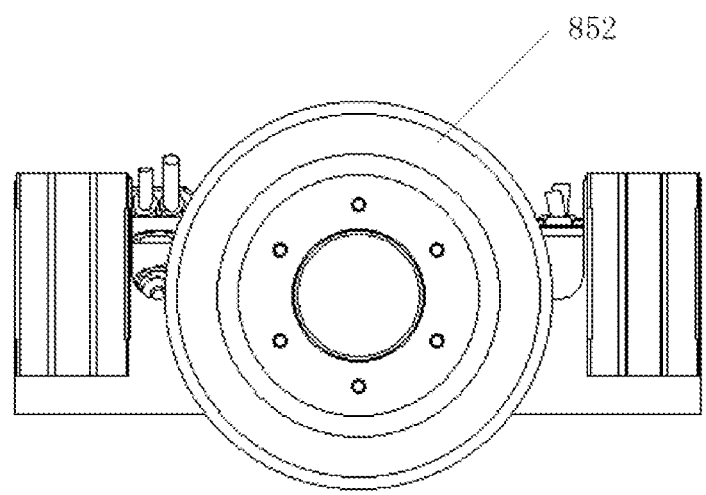
FIG. 14C is a side view of a chassis, according to an embodiment of the specification.

In an embodiment, the vehicle body member 83 includes a chassis 831 and a housing 832, and the chassis 831 includes a body 85 shown in FIG. 14A, FIG. 14B, and FIG. 14C. Two synchronization wheels 851, a driving wheel 852 connected to each synchronization wheel 851, servo motors 853 disposed on the corresponding driving wheel 852, and a synchronization belt 854 connecting the synchronization wheel 851 to the corresponding servo motor 853 are mounted on the body 85.

Figure 14D:
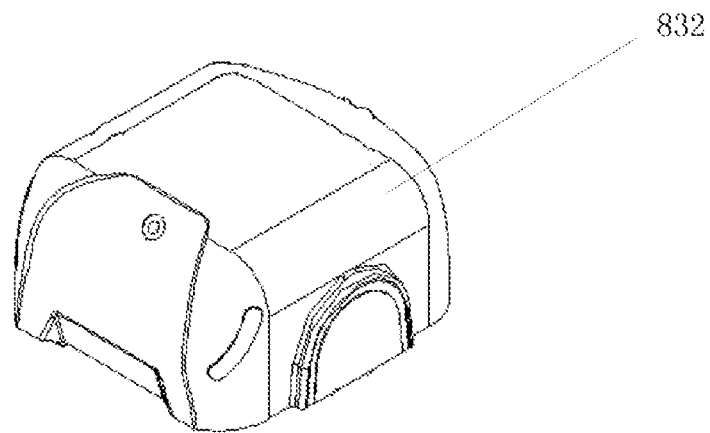
FIG. 14D is a schematic diagram of a housing, according to an embodiment of the specification.
Figure 14E:
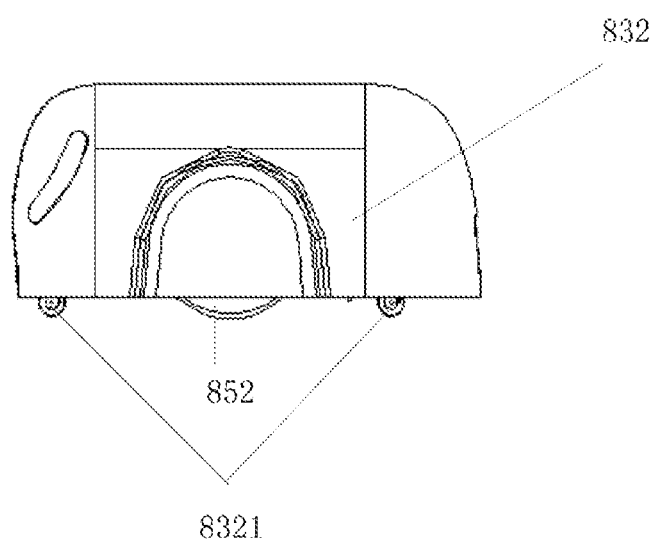
FIG. 14E is a side view of a housing, according to an embodiment of the specification.
Figure 14F:
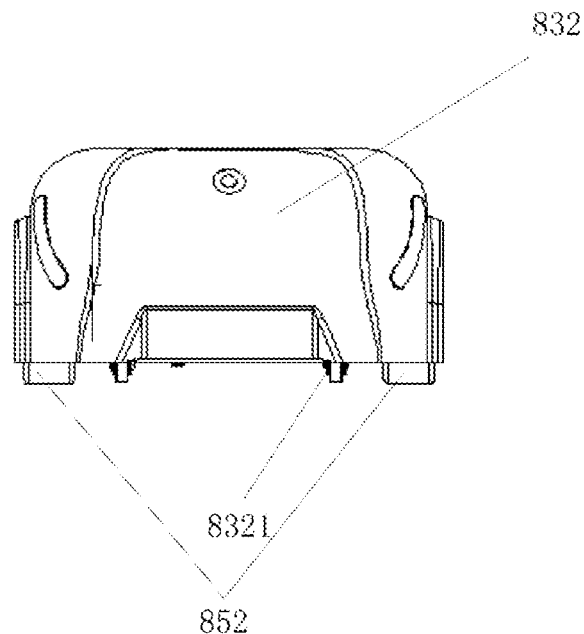
FIG. 14F is a front view of a housing, according to an embodiment of the specification.

Referring to FIG. 14D, FIG. 14E, and FIG. 14F, at least a pair of rollers 8321 are disposed on one side of the housing 832 facing away from the lifting member 82, to ensure stability of a vehicle body. The roller 8321 and the driving wheel 852 are simultaneously in contact with the ground, so that the vehicle body member is parallel to the ground.

In this embodiment of the specification, the body 85 may be disposed inside the chassis 831 of the vehicle body member 83. In particular, the servo motor 853 drives the synchronization belt 854 to rotate the synchronization wheel 851, and the synchronization wheel 851 drives the driving wheel 852 to rotate.

Figure 15:
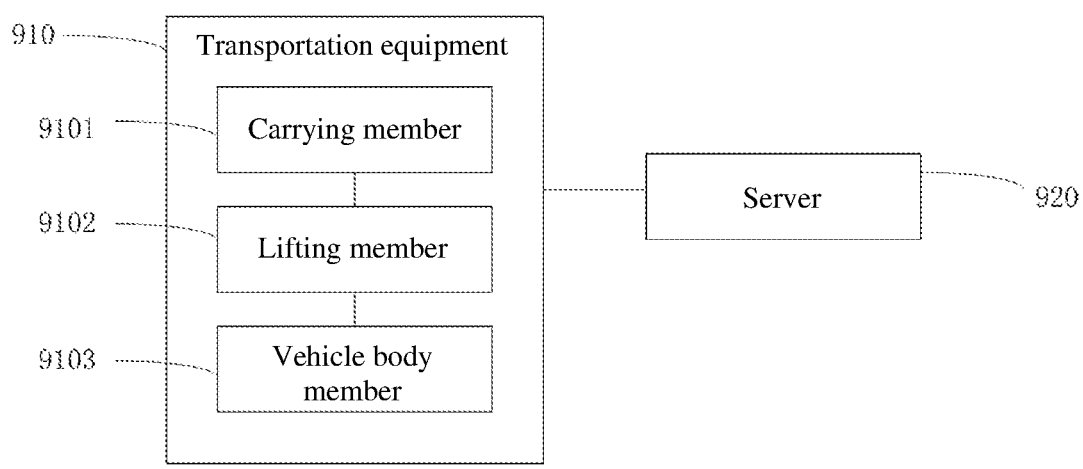
FIG. 15 is a structural diagram of a transportation system, according to an embodiment of the specification.

Referring to FIG. 15, an embodiment of the specification further provides a transportation system, including: transportation equipment 910 and a server 920. The transportation equipment 910 includes a carrying member 9101, a lifting member 9102, and a vehicle body member 9103, one end of the lifting member 9102 being connected to the vehicle body member 9103, and the other end of the lifting member 9102 being connected to the carrying member 9101. The lifting member 9102 is configured to elevate the carrying member 9101 or lower the carrying member 9101. The transportation equipment 910 and the server 920 are connected via wired or wireless connection.

In this embodiment of the specification, the server may be connected to the transportation equipment in real time to determine distance data between each piece of transportation equipment and a target position, and control operation of the transportation equipment or control the lifting device of the transportation equipment to be elevated or lowered. The real-time connection between the server and the transportation equipment may be a wired or wireless connection, and this is not limited in the specification. Further, the server may assign a path to the transportation equipment. The server may further receive the logistics object feature information transmitted by a graphic coding scanning device, to determine the object collecting equipment corresponding to the transportation equipment.

A basic operation procedure of the transportation system is as follows.

In a docking station, a single piece of logistics object is placed on the transportation equipment by human or machine. After carrying the logistics object, the transportation equipment goes to a code scanning region according to a preset path, and the code scanning equipment scans code for the logistics object carried by the transportation equipment to acquire logistics object feature information of the logistics object, that is, destination information. In this case, the code scanning equipment sends the logistics object feature information to the server, the server assigns a path to the corresponding object collecting equipment to the transportation equipment based on the logistics object feature information, and the transportation equipment moves to the object collecting equipment in a work site path region according to this path, and unloads the logistics object into the object collecting equipment, thereby completing sorting of the logistics object.

The specification provides a transportation device on which a carrying member, a lifting member, and a vehicle body member are disposed. One end of the lifting member is connected to the vehicle body member, the other end of the lifting member is connected to the carrying member, and the lifting member is configured to elevate the carrying member or lower the carrying member. Since the transportation equipment employs the lifting device, a working height of transportation equipment meets ergonomic requirements and there is no need for workers to bend for handling logistics packages in a docking process, so that the labor intensity of workers is reduced, and the sorting efficiency of a sorting system is improved. Moreover, logistics objects do not need to be poured into object collecting equipment through a steer framework platform, so that the setting costs of the sorting system are reduced, and the flexibility of the sorting system is greatly improved.

The embodiments in the specification are all described in a progressive manner. Descriptions of each embodiment focus on differences from other embodiments, and same or similar parts among respective embodiments may be mutually referenced.

Persons skilled in the art should understand that, the embodiments of the specification may be provided as methods, apparatuses, or computer program products. Therefore, the embodiments of the specification may use a form of hardware only embodiments, software only embodiments, or embodiments with a combination of software and hardware. Moreover, the embodiments of the specification may use a form of a computer program product that is implemented on one or more computer-usable storage media (including but not limited to a disk memory, a CD-ROM, an optical memory, and the like) that include computer-usable program code.

The embodiments of the specification is described with reference to flowcharts and/or block diagrams of the method, the terminal device (the system), and the computer program product in the embodiments of the specification. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing terminal device to generate a machine, so that an apparatus configured to implement functions specified in one or more procedures in the flowcharts and/or one or more blocks in the block diagrams is generated by using instructions executed by the general-purpose computer or the processor of another programmable data processing terminal device.

These computer program instructions may also be stored in a computer readable memory that can instruct the computer or any other programmable data processing terminal device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may further be loaded onto a computer or another programmable data processing terminal device, so that a series of operations and steps are performed on the computer or the another programmable terminal device, thereby generating computer-implemented processing. Therefore, the instructions executed on the computer or the another programmable terminal device provide steps for implementing a specific function in one or more processes in the flowcharts and/or in one or more blocks in the block diagrams.

Although preferable embodiments of the embodiments of the specification have been described, once persons skilled in the technology know a basic creative concept, they can make other changes and modifications to these embodiments. Therefore, the following claims are intended to cover the preferable embodiments and all changes and modifications falling within the scope of the embodiments of the specification.

At last, it should be noted that the relational terms herein such as first and second are used only to differentiate an entity or operation from another entity or operation, and do not require or imply any actual relationship or sequence between these entities or operations. Moreover, the terms "include," "comprise," and any variants thereof are intended to cover a non-exclusive inclusion. Therefore, in the context of a process, a method, an object, or an apparatus that includes a series of elements, the process, method, object, or terminal device not only includes such elements, but also includes other elements not specified expressly, or may include inherent elements of the process, method, object, or terminal device. Unless otherwise specified, an element limited by "include a/an . . . " does not exclude other same elements existing in the process, the method, the article, or the terminal device that includes the element.

The equipment control method and device provided in the specification are described in detail above. The principle and implementations of the specification are described herein by using specific examples. The descriptions of the foregoing embodiments are merely used for helping understand the method and core ideas of the specification. In addition, a person of ordinary skill in the art can make variations to the specification in terms of the specific implementations and application scopes according to the ideas of the specification. Therefore, the content of the specification shall not be construed as a limit on the specification.

What is claimed is:

1. A method for controlling equipment, comprising:
   acquiring distance data between a current position and a target position of transportation equipment; and
   controlling operations of the transportation equipment and a lifting device of the transportation equipment according to the distance data, comprising:
      determining, based on a current elevation of the lifting device and the distance data, a target elevation of the lifting device, an elevating speed of the lifting device and a travel speed of the transportation equipment; and
      according to a first distance, a second distance, or a third distance, controlling the lifting device to elevate or lower at the elevating speed from the current elevation to the target elevation, and controlling the transportation equipment to travel at the travel speed, wherein the first distance $s1=L*v2/v1$, the second distance $s2=L*v2/v1+\Delta s$, or the third distance $s3=2L*v2/v1+\Delta s$, and wherein L is a total height of the lifting device, v2 is a maximum travel speed of the transportation equipment, v1 is the elevating speed of the lifting device, and $\Delta s$ is a distance adjustment constant.

2. The method according to claim 1, wherein the target position comprises at least one of a position of a pickup node, a position of a code scanning node, or a position of a receiving node, the pickup node includes a docking station, the code scanning node includes code scanning equipment, and the receiving node includes object collecting equipment.

3. method according to claim 1, wherein the controlling operations of a lifting device of the transportation equipment and the transportation equipment according to the distance data comprises: if the distance data is greater than or equal to the first distance and less than or equal to the second distance, controlling the lifting device to be elevated from the current elevation at the elevating speed, and controlling the transportation equipment to travel at the travel speed, wherein the current elevation of the lifting device is at the target elevation when the transportation equipment reaches the target position, and wherein the second distance is greater than the first distance.

4. The method according to claim 3, wherein if the current elevation of the lifting device is at the target elevation, controlling the lifting device to remain at the target elevation.

5. The method according to claim 1, wherein the controlling operations of a lifting device of the transportation equipment and the transportation equipment according to the distance data comprises: if the distance data is greater than or equal to the third distance, controlling the transportation equipment to travel at a first travel speed, and controlling the lifting device to be lowered from the current elevation to a lowest elevation at the elevating speed if the lifting device is not at the lowest elevation, wherein the third distance is greater than the second distance and the first distance.

6. The method according to claim 1, wherein the controlling operations of a lifting device of the transportation equipment and the transportation equipment according to the distance data comprises: if the distance data is less than the third distance, controlling the transportation equipment to travel at a second travel speed, wherein the second travel speed is less than a first travel speed, and the third distance is greater than the second distance and the first distance.

7. A system for controlling equipment, comprising a processor and a non-transitory computer-readable storage medium storing instructions executable by the processor to cause the system to perform operations comprising:
   acquiring distance data between a current position and a target position of transportation equipment; and
   controlling operations of a lifting device of the transportation equipment and the transportation equipment according to the distance data, comprising:
      determining, based on a current elevation of the lifting device and the distance data, a target elevation of the lifting device, an elevating speed of the lifting device and a travel speed of the transportation equipment; and according to a first distance, a second distance, or a third distance, controlling the lifting device to elevate or lower at the elevating speed from the current elevation to the target elevation, and controlling the transportation equipment to travel at the travel speed, wherein the first distance s1=L*v2/v1, the second distance s2=L*v2/v1+Δs, or the third distance s3=2L*v2/v1+Δs, and wherein L is a total height of the lifting device, v2 is a maximum travel speed of the transportation equipment, v1 is the elevating speed of the lifting device, and Δs is a distance adjustment constant.

8. The system according to claim 7, wherein the target position comprises at least one of a position of a pickup node, a position of a code scanning node, or a position of a receiving node, the pickup node includes a docking station, the code scanning node includes code scanning equipment, and the receiving node includes object collecting equipment.

9. The system according to claim 7, wherein the controlling operations of a lifting device of the transportation equipment and the transportation equipment according to the distance data comprises: if the distance data is greater than or equal to the first distance and less than or equal to the second distance, controlling the lifting device to be elevated from the current elevation at the elevating speed, and controlling the transportation equipment to travel at the travel speed, wherein the current elevation of the lifting device is at the target elevation when the transportation equipment reaches the target position, and wherein the second distance is greater than the first distance.

10. The system according to claim 9, wherein if the current elevation of the lifting device is the target elevation, controlling the lifting device to remain at the target elevation.

11. The system according to claim 7, wherein the controlling operations of a lifting device of the transportation equipment and the transportation equipment according to the distance data comprises: if the distance data is greater than or equal to the third distance, controlling the transportation equipment to travel at a first travel speed, and controlling the lifting device to be lowered from the current elevation to a lowest elevation at the elevating speed if the lifting device is not at the lowest elevation, wherein the third distance is greater than the second distance and the first distance.

12. The system according to claim 7, wherein the controlling operations of a lifting device of the transportation equipment and the transportation equipment according to the distance data comprises: if the distance data is less than the third distance, controlling the transportation equipment to travel at a second travel speed, wherein the second travel speed is less than a first travel speed, and the third distance is greater than the second distance and the first distance.

13. A non-transitory computer-readable storage medium for controlling equipment, configured with instructions executable by one or more processors to cause the one or more processors to perform operations comprising:
acquiring distance data between a current position and a target position of transportation equipment; and
controlling operations of a lifting device of the transportation equipment and the transportation equipment according to the distance data, comprising:
determining, based on a current elevation of the lifting device and the distance data, a target elevation of the lifting device, an elevating speed of the lifting device and a travel speed of the transportation equipment; and
according to a first distance, a second distance, or a third distance, controlling the lifting device to elevate or lower at the elevating speed from the current elevation to the target elevation, and controlling the transportation equipment to travel at the travel speed, wherein the first distance s1=L*v2/v1, the second distance s2=L*v2/v1+Δs, or the third distance s3=2L*v2/v1+Δs, and wherein L is a total height of the lifting device, v2 is a maximum travel speed of the transportation equipment, v1 is the elevating speed of the lifting device, and Δs is a distance adjustment constant.

14. The storage medium according to claim 13, wherein the target position comprises at least one of a position of a pickup node, a position of a code scanning node, or a position of a receiving node, the pickup node includes a docking station, the code scanning node includes code scanning equipment, and the receiving node includes object collecting equipment.

15. The storage medium according to claim 13, wherein the controlling operations of a lifting device of the transportation equipment and the transportation equipment according to the distance data comprises: if the distance data is greater than or equal to the first distance and less than or equal to the second distance, controlling the lifting device to be elevated from the current elevation at the elevating speed, and controlling the transportation equipment to travel at the travel speed, wherein the current elevation of the lifting device is at the target elevation when the transportation equipment reaches the target position, and wherein the second distance is greater than the first distance.

16. The storage medium according to claim 13, wherein the controlling operations of a lifting device of the transportation equipment and the transportation equipment according to the distance data comprises: if the distance data is greater than or equal to the third distance, controlling the transportation equipment to travel at a first travel speed, and controlling the lifting device to be lowered from the current elevation to a lowest elevation at the elevating speed if the lifting device is not at the lowest elevation, wherein the third distance is greater than the second distance and the first distance.

17. The storage medium according to claim 13, wherein the controlling operations of a lifting device of the transportation equipment and the transportation equipment according to the distance data comprises: if the distance data is less than the third distance, controlling the transportation equipment to travel at a second travel speed, wherein the second travel speed is less than a first travel speed, and the third distance is greater than the second distance and the first distance.

* * * * *